United States Patent
Wang et al.

(10) Patent No.: US 11,999,840 B2
(45) Date of Patent: Jun. 4, 2024

(54) AUTOMOTIVE COMPOSITION

(71) Applicant: Borealis AG, Vienna (AT)

(72) Inventors: Jingbo Wang, Linz (AT); Markus Gahleitner, Linz (AT); Klaus Bernreitner, Linz (AT); Hermann Braun, Linz (AT); Andreas Rössler-Czermak, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 18/019,862

(22) PCT Filed: Aug. 11, 2021

(86) PCT No.: PCT/EP2021/072353
§ 371 (c)(1),
(2) Date: Feb. 6, 2023

(87) PCT Pub. No.: WO2022/034126
PCT Pub. Date: Feb. 17, 2022

(65) Prior Publication Data
US 2023/0348705 A1    Nov. 2, 2023

(30) Foreign Application Priority Data
Aug. 13, 2020  (EP) .................................... 20190826

(51) Int. Cl.
*C08L 23/12*   (2006.01)
(52) U.S. Cl.
CPC ......... *C08L 23/12* (2013.01); *C08L 2205/025* (2013.01); *C08L 2205/035* (2013.01); *C08L 2207/02* (2013.01); *C08L 2207/20* (2013.01)

(58) Field of Classification Search
None
See application file for complete search history.

(56) References Cited

U.S. PATENT DOCUMENTS

| | | |
|---|---|---|
| 5,272,236 A | 12/1993 | Lai et al. |
| 2020/0102449 A1 | 4/2020 | Van Beek |
| 2020/0385555 A1 | 12/2020 | Kahlen et al. |

FOREIGN PATENT DOCUMENTS

| | | |
|---|---|---|
| CN | 106380699 A | 2/2017 |
| CN | 110312758 A | 10/2019 |

(Continued)

OTHER PUBLICATIONS

Chinese Office Action with English translation for CN Application No. 202180057074.7 mailed on Apr. 2, 2024 (Year: 2024).*

(Continued)

*Primary Examiner* — Richard A Huhn
(74) *Attorney, Agent, or Firm* — Lowenstein Sandler LLP

(57) ABSTRACT

A composition comprising (A) 18.0 to 60.0 wt.-% of a heterophasic composition (HECO); (B) 7.0 to 55.0 wt.-% of a polypropylene-polyethylene blend (B); (C) 0.0 to 12.0 wt.-% of an HDPE; (D) 2.0 to 12.0 wt.-% of plastomer; and (E) 7.0 to 25.0 wt.-% of talc; wherein the HECO has a Tm of 150 to 159° C., an MFR2 of 20.0 to 120 g/10 min, a CRYSTEX QC crystalline fraction of 79.0 to 91.0 wt.-%, a CRYSTEX QC soluble fraction of 9.0 to 21.0 wt.-%, and an ethylene content of 1.5 to 6.5 mol.-%; blend (B) comprises at least 85.0 wt.-% of polypropylene and at most 15.0 wt.-% of polyethylene and has an MFR2 of 5.0 to 75 g/10 min and an ash content of 0.1 to 3.0 wt.-%; and the plastomer is a C2/C8 or a C2/C4 copolymer having a density of 850 to 900 kg/m3.

15 Claims, 2 Drawing Sheets

Figure 1 (b) Elution of the EP copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene

(56) References Cited

FOREIGN PATENT DOCUMENTS

| | | | |
|---|---|---|---|
| CN | 110546198 | A | 12/2019 |
| EP | 0887379 | B1 | 12/2004 |
| EP | 2036947 | A1 | 3/2009 |
| EP | 2746325 | A1 | 6/2014 |
| RU | 2520448 | C2 | 6/2014 |
| WO | 9212182 | A1 | 7/1992 |
| WO | 9414856 | A1 | 7/1994 |
| WO | 9512622 | A1 | 5/1995 |
| WO | 9924478 | A1 | 5/1999 |
| WO | 9924479 | A1 | 5/1999 |
| WO | 0068315 | A1 | 11/2000 |
| WO | 2004000899 | A1 | 12/2003 |
| WO | 2004111095 | A1 | 12/2004 |
| WO | 2006097497 | A1 | 9/2006 |
| WO | 2007116034 | A1 | 10/2007 |
| WO | 2011076780 | A1 | 6/2011 |
| WO | 2011135004 | A2 | 11/2011 |
| WO | 2012001052 | A1 | 1/2012 |
| WO | 2012084961 | A1 | 6/2012 |
| WO | 2015158790 | A2 | 10/2015 |
| WO | 2015169690 | A1 | 11/2015 |
| WO | 2018122134 | A1 | 7/2018 |
| WO | 2019179959 | A1 | 9/2019 |
| WO | 200202576 | A1 | 1/2022 |

OTHER PUBLICATIONS

International Search Report and Written Opinion for PCT/EP2021/072353 dated Dec. 2, 2021, 12 pages.
International Preliminary Report on Patentability for PCT/EP2021/072353 dated Sep. 30, 2022.
European Search Report for 20190826.6 dated May 14, 2021, 9 pages.
Busico, et al., "Microstructure of polypropylene," Progress in Polymer Science, vol. 26, 2001, pp. 443-533.
Busico, et al., "Alk-1-ene Polymerization in the Presence of a Monocyclopentadienyl Zirconium (iv) Acetamidinate Catalyst: Microstructural and Mechanistic Insights a," Macromolecular Rapid Commun., vol. 28, 2007, pp. 1128-1134.
Busico, et al., "Full Assignment of the 13C NMR Spectra of Regioregular Polypropylenes: Methyl and Methylene Region," Macromolecules, 1997, vol. 30, pp. 6251-6263, American Chemical Society.
Zweifel, et al., "Nucleating Agents for Semi-crystalline Polymers," Plastics Additives Handbook, 6th Edition, 2009, pp. 966-990, Hanser Publishers, Munich.
Resconi, et al., "Selectivity in Propene Polymerization with Metallocene Catalysts," Chem. Rev., 2000, vol. 100, pp. 1253-1345.
Singh, et al., "Triad Sequence Determination of Ethylene-Propylene Copolymers—Application of Quantitative 13C NMR," Polymer Testing, 2009, vol. 29, pp. 475-479.
Wang, et al., "Structural Analysis of Ethylene/Propylene Copolymers Synthesized with a Constrained Geometry Catalyst," Macromolecules, 2000, vol. 33, pp. 1157-1162.
Zhou, et al., "A new decoupling method for accurate quantification of polyethylene copolymer composition and triad sequence distribution with 13C NMR," Journal of Magnetic Resonance, vol. 187, 2007, pp. 225-233.
Cheng, H.N., "C NMR Analysis of Ethylene-Propylene Rubbers," Macromolecules, 1984, vol. 17, 1984, pp. 1950-1955.
English Translation of Search Report for Russian Application No. 2013105027 dated May 19, 2023, 2 pages.
Office Action for Russian Patent Application No. 2013105027 with English Translation dated May 19, 2023, 8 pages.

* cited by examiner

Figure 1: (a) Schematic diagram of the CRYSTEX QC instrument

Figure 1 (b) Elution of the EP copolymer sample and obtained soluble and crystalline fractions in the TREF column (column filled with inert material e.g. glass beads) (see Del Hierro, P.; Ortin, A.; Monrabal, B.; 'Soluble Fraction Analysis in polypropylene

AUTOMOTIVE COMPOSITION

CROSS-REFERENCE TO RELATED APPLICATION(S)

The present application is a national stage entry under 35 U.S.C. § 371 of International Application No. PCT/EP2021/072353, filed on Aug. 11, 2021, which claims priority to European Patent Application No. 20190826.6, filed on Aug. 13, 2020. The contents of these applications are hereby incorporated by reference in their entirety.

FIELD OF INVENTION

The present invention is directed to a new composition suitable for automotive articles, especially automotive interior articles, comprising a heterophasic propylene copolymer with low ethylene content produced with a metallocene catalyst, a recycled polypropylene-polyethylene blend, a plastomer and talc. The invention is further directed to automotive articles comprising said composition.

BACKGROUND

It is well known to use heterophasic propylene copolymers in the automotive industry mainly due to their low specific weight and good performance. In some specific areas, like for car interior applications, low emission is an important issue. The essential drawback of the current solutions on the market is that they have rather high emission essentially driven by the polypropylene components. Typically, heterophasic propylene copolymers are featured by rather high amounts of oligomers, which are mainly responsible for rather high carbon compound emission values, like high VOC values or FOG values. The values can be to some extent reduced due to washing steps, however such steps complicate the production process and are environmental unfriendly. Some heterophasic propylene copolymers having rather low emission values are already known, although these suffer from low melting temperature and/or low stiffness.

Thus one object of the present invention is to provide a heterophasic propylene copolymer composition which is suited to reduce the emission values of compositions applicable for automotive articles, especially automotive interior articles, but not compromising the mechanical performance, especially stiffness and impact.

One of the fundamental problems in the polymer industry is recycling. Presently the market for recyclates, particularly recyclates from household waste, commonly denoted PCR ('post-consumer resins') is somewhat limited. Starting from household waste, the sorting and separation processes employed will not allow preparing pure polymers, i.e. there will always be some contaminants, or the processes may even result in blends of different polymers. When it comes to polyolefins, which constitute the vast majority of the polymer fraction of the collected household waste, a perfect separation of polypropylene and polyethylene is nigh impossible. Recycled polyolefin materials, particularly post-consumer resins, are conventionally cross-contaminated with non-polyolefin materials such as polyethylene terephthalate, polyamide, polystyrene or non-polymeric substances like wood, paper, glass or aluminum. Even worse, those post-consumer recycled polyolefin materials are readily available on a multi-ton scale but unfortunately have limited mechanical properties and frequently severe odor and/or emission problems.

In addition to having demanding requirements for the mechanical properties of their components, the automotive industry also has stringent requirements regarding odor and emissions, and requirements are likely to be tightened further going forward. This dramatically limits the use of recyclates in automotive applications.

However, there is a deeply felt need for allowing the repurposing and reuse of post-consumer polyolefin recyclates in finished articles without health and safety hazards.

The present invention is based on the surprising finding that sophisticated heterophasic polypropylene copolymers may be at least in part replaced by polypropylene-polyethylene blends as originating from post-consumer recycled polyolefin streams.

SUMMARY OF THE INVENTION

Figure 1A:
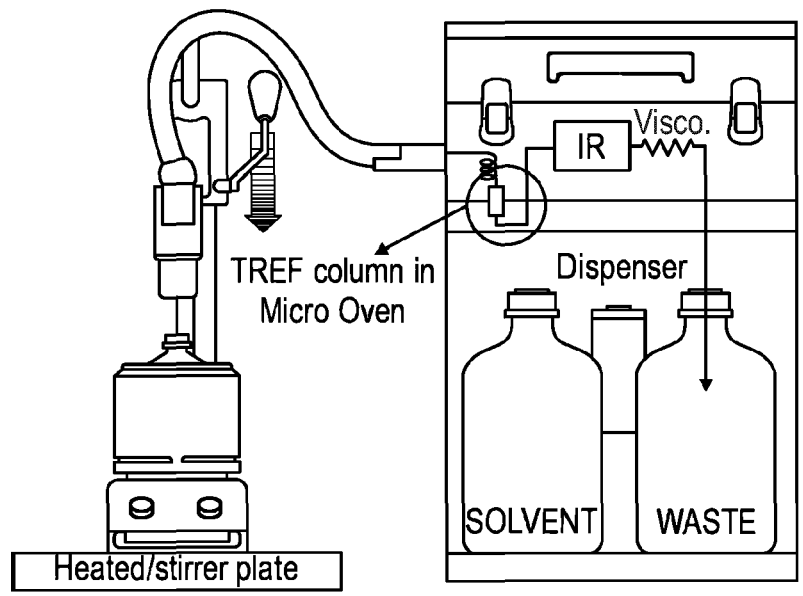
FIG. 1(a) is a schematic diagram of the CRYSTEX QC instrument.

The finding of the present invention is to provide a composition comprising a heterophasic propylene copolymer produced with a metallocene catalyst and having low total ethylene content, a recycled polypropylene-polyethylene blend, a plastomer, talc and optionally a high density polyethylene (HDPE).

Accordingly, the present invention is directed to a composition comprising (A) 18.0 to 60.0 wt.-%, based on the total composition, of a heterophasic composition (HECO);

(B) 7.0 to 55.0 wt.-%, based on the total composition, of a polypropylene-polyethylene blend (B);

(C) 0.0 to 12.0 wt.-%, based on the total composition, of a high density polyethylene (HDPE);

(D) 5.0 to 15.0 wt.-%, based on the total composition of polyethylene being the sum of said high density polyethylene (HDPE) and polyethylene contained in said polypropylene-polyethylene blend (B);

(E) 2.0 to 12.0 wt.-%, based on the total composition, of plastomer (P); and (F) 7.0 to 25.0 wt.-%, based on the total composition, of talc (T);

wherein the heterophasic composition (HECO), the polypropylene-polyethylene blend (B), the high density polyethylene (HDPE), the plastomer (P) and the talc (T) make up together at least 90 wt.-% of the total composition;

wherein further the heterophasic composition (HECO) comprises (a) a propylene homopolymer as the matrix, and (b) an ethylene-propylene rubber being dispersed in said matrix, wherein the heterophasic propylene copolymer (HECO) has (i) a melting temperature Tm, measured by DSC according to ISO 11357-3 (heating and cooling rate 10° C./min), in the range from 150 to 159° C.;

(ii) a melt flow rate $MFR_2$ (230° C., 2.16 kg), measured according to ISO 1133, in the range from 20.0 to 120 g/10 min;

(iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);

(iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and (v) a total ethylene content, measured by Fourier Transform Infrared Spectroscopy (FITR) during CRYSTEX analysis, in the range from 1.5 to 6.5 mol.-%, wherein ethylene is the sole comonomer in the heterophasic composition (HECO);

the polypropylene-polyethylene blend (B) comprises:

B-1) at least 85.0 wt.-%, relative to the total weight of the polypropylene-polyethylene blend (B), of polypropylene, B-2) at most 15.0 wt.-%, relative to the total weight of the polypropylene-polyethylene blend (B), of polyethylene, wherein the polypropylene-polyethylene blend (B) has:

i) a melt flow rate $MFR_2$ (230° C., 2.16 kg), measured according to ISO 1133, in the range from 5.0 to 75 g/10 min; and ii) a residual ash content, measured by thermogravimetric analysis in the range from 0.1 to 3.0 wt.-%; and one or more of the following:

iii) a content of limonene as determined by using solid phase microextraction (HS-SPME-GC-MS) of from 0.1 ppm to 100 ppm;

iv) a content of fatty acid(s) as determined by using solid phase microextraction (HS-SPME-GC-MS) of 0.1 to 100 ppm;

v) a content of polyamide(s) as determined by NMR of 0 to 1.5 wt.-%;

vi) a content of polystyrene(s) as determined by NMR of 0.05 to 3.0 wt.-%;

the plastomer being an ethylene 1-octene copolymer or an ethylene 1-butene copolymer having a density measured according to ISO 1183-1 in the range from 850 to 900 kg/m$^3$.

Alternatively the invention is directed to a composition comprising (A) 18.0 to 60.0 wt.-%, based on the total composition, of a heterophasic composition (HECO);

(B) 7.0 to 55.0 wt.-%, based on the total composition, of a polypropylene-polyethylene blend (B);

(C) 0.0 to 12.0 wt.-%, based on the total composition, of a high density polyethylene (HDPE);

(D) 5.0 to 15.0 wt.-%, based on the total composition of polyethylene being the sum of said high density polyethylene (HDPE) and polyethylene contained in said polypropylene-polyethylene blend (B);

(E) 2.0 to 12.0 wt.-%, based on the total composition, of plastomer (P); and (F) 7.0 to 25.0 wt.-%, based on the total composition, of talc (T);

wherein the heterophasic composition (HECO), the polypropylene-polyethylene blend (B), the high density polyethylene (HDPE), the plastomer (P) and the talc (T) make up together at least 90 wt.-% of the total composition;

wherein further the heterophasic composition (HECO) comprises (a) a propylene homopolymer as the matrix, wherein the propylene homopolymer has 2,1 regiodefects, determined by $^{13}$C-NMR, in the range from 0.05 to 0.90% and (b) an ethylene-propylene rubber being dispersed in said matrix, wherein the heterophasic propylene copolymer (HECO) has (i) a melt flow rate $MFR_2$ (230° C., 2.16 kg), measured according to ISO 1133, in the range from 20.0 to 120 g/10 min;

(ii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);

(iii) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and (iv) a total ethylene content, measured by Fourier Transform Infrared Spectroscopy (FITR) during CRYSTEX analysis, in the range from 1.5 to 6.5 mol.-%, wherein ethylene is the sole comonomer in the heterophasic composition (HECO);

the polypropylene-polyethylene blend (B) comprises:

B-1) at least 85.0 wt.-%, relative to the total weight of the polypropylene-polyethylene blend (B), of polypropylene, B-2) at most 15.0 wt.-%, relative to the total weight of the polypropylene-polyethylene blend (B), of polyethylene, wherein the polypropylene-polyethylene blend (B) has:

i) a melt flow rate $MFR_2$ (230° C., 2.16 kg), measured according to ISO 1133, in the range from 5.0 to 75 g/10 min; and ii) a residual ash content, measured by thermogravimetric analysis in the range from 0.1 to 3.0 wt.-%; and one or more of the following:

iii) a content of limonene as determined by using solid phase microextraction (HS-SPME-GC-MS) of from 0.1 ppm to 100 ppm;

iv) a content of fatty acid(s) as determined by using solid phase microextraction (HS-SPME-GC-MS) of 0.1 to 100 ppm;

v) a content of polyamide(s) as determined by NMR of 0 to 1.5 wt.-%;

vi) a content of polystyrene(s) as determined by NMR of 0.05 to 3.0 wt.-%;

the plastomer being an ethylene 1-octene copolymer or an ethylene 1-butene copolymer having a density measured according to ISO 1183-1 in the range from 850 to 900 kg/m$^3$.

Hence the present invention is especially directed to a composition comprising (A) 18.0 to 60.0 wt.-%, based on the total composition, of a heterophasic composition (HECO);

(B) 7.0 to 55.0 wt.-%, based on the total composition, of a polypropylene-polyethylene blend (B);

(C) 0.0 to 12.0 wt.-%, based on the total composition, of a high density polyethylene (HDPE);

(D) 5.0 to 15.0 wt.-%, based on the total composition of polyethylene being the sum of said high density polyethylene (HDPE) and polyethylene contained in said polypropylene-polyethylene blend (B);

(E) 2.0 to 12.0 wt.-%, based on the total composition, of plastomer (P); and
(F) 7.0 to 25.0 wt.-%, based on the total composition, of talc (T);
wherein
the heterophasic composition (HECO), the polypropylene-polyethylene blend (B), the high density polyethylene (HDPE), the plastomer (P) and the talc (T) make up together at least 90 wt.-% of the total composition;
wherein further
the heterophasic composition (HECO) comprises
 (a) a propylene homopolymer as the matrix, wherein the propylene homopolymer has 2,1 regiodefects, determined by $^{13}$C-NMR, in the range from 0.05 to 0.90% and
 (b) an ethylene-propylene rubber being dispersed in said matrix,
wherein the heterophasic propylene copolymer (HECO) has
 (i) a melting temperature Tm, measured by DSC according to ISO 11357-3 (heating and cooling rate 10° C./min), in the range from 150 to 159° C.;
 (ii) a melt flow rate MFR$_2$ (230° C., 2.16 kg), measured according to ISO 1133, in the range from 20.0 to 120 g/10 min;
 (iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);
 (iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and
 (v) a total ethylene content, measured by Fourier Transform Infrared Spectroscopy (FITR) during CRYSTEX analysis, in the range from 1.5 to 6.5 mol.-%, wherein ethylene is the sole comonomer in the heterophasic composition (HECO);
the polypropylene-polyethylene blend (B) comprises:
B-1) at least 85.0 wt.-%, relative to the total weight of the polypropylene-polyethylene blend (B), of polypropylene,
B-2) at most 15.0 wt.-%, relative to the total weight of the polypropylene-polyethylene blend (B), of polyethylene,
wherein the polypropylene-polyethylene blend (B) has:
 i) a melt flow rate MFR$_2$ (230° C., 2.16 kg), measured according to ISO 1133, in the range from 5.0 to 75 g/10 min; and
 ii) a residual ash content, measured by thermogravimetric analysis in the range from 0.1 to 3.0 wt.-%;
and one or more of the following:
 iii) a content of limonene as determined by using solid phase microextraction (HS-SPME-GC-MS) of from 0.1 ppm to 100 ppm;
 iv) a content of fatty acid(s) as determined by using solid phase microextraction (HS-SPME-GC-MS) of 0.1 to 100 ppm;
 v) a content of polyamide(s) as determined by NMR of 0 to 1.5 wt.-%;
 vi) a content of polystyrene(s) as determined by NMR of 0.05 to 3.0 wt.-%;

the plastomer being an ethylene 1-octene copolymer or an ethylene 1-butene copolymer having a density measured according to ISO 1183-1 in the range from 850 to 900 kg/m$^3$.

Further preferred embodiments of the inventive composition are defined in the dependent claims.

In addition, the present invention is directed to an automotive article, especially an automotive article, comprising at least 95 wt.-%, preferably consisting of, of a composition comprising
(A) 18.0 to 60.0 wt.-%, based on the total composition, of a heterophasic composition (HECO);
(B) 7.0 to 55.0 wt.-%, based on the total composition, of a polypropylene-polyethylene blend (B);
(C) 0.0 to 12.0 wt.-%, based on the total composition, of a high density polyethylene (HDPE);
(D) 2.0 to 12.0 wt.-%, based on the total composition, of plastomer (P); and
(E) 7.0 to 25.0 wt.-%, based on the total composition, of talc (T);
wherein
the heterophasic composition (HECO), the polypropylene-polyethylene blend (B), the high density polyethylene (HDPE), the plastomer (P) and the talc (T) make up together at least 90 wt.-% of the total composition;
wherein further
the heterophasic composition (HECO) comprises
 (a) a propylene homopolymer as the matrix, wherein the propylene homopolymer has 2,1 regiodefects, determined by $^{13}$C-NMR, in the range from 0.05 to 0.90% and
 (b) an ethylene-propylene rubber being dispersed in said matrix,
wherein the heterophasic propylene copolymer (HECO) has
 (i) a melting temperature Tm, measured by DSC according to ISO 11357-3 (heating and cooling rate 10° C./min), in the range from 150 to 159° C.;
 (ii) a melt flow rate MFR$_2$ (230° C., 2.16 kg), measured according to ISO 1133, in the range from 20.0 to 120 g/10 min;
 (iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);
 (iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and
 (v) a total ethylene content, measured by Fourier Transform Infrared Spectroscopy (FITR) during CRYSTEX analysis, in the range from 1.5 to 6.5 mol.-%, wherein ethylene is the sole comonomer in the heterophasic composition (HECO);
the polypropylene-polyethylene blend (B) comprises:
B-1) at least 85.0 wt.-%, relative to the total weight of the polypropylene-polyethylene blend (B), of polypropylene,
B-2) at most 15.0 wt.-%, relative to the total weight of the polypropylene-polyethylene blend (B), of polyethylene,
wherein the polypropylene-polyethylene blend (B) has:
 i) a melt flow rate MFR$_2$ (230° C., 2.16 kg), measured according to ISO 1133, in the range from 5.0 to 75 g/10 min; and ii) a residual ash content, measured by thermogravimetric analysis in the range from 0.1 to 3.0 wt.-%
the plastomer being an ethylene 1-octene copolymer or an ethylene 1-butene copolymer having a density measured according to ISO 1183-1 in the range from 850 to 900 kg/m$^3$.

In the following, the invention is described in more detail.

DEFINITIONS

Unless defined otherwise, all technical and scientific terms used herein have the same meaning as commonly understood by one of ordinary skill in the art to which the invention pertains.

Although, any methods and materials similar or equivalent to those described herein can be used in practice for testing of the present invention, the preferred materials and methods are described herein. In describing and claiming the present invention, the following terminology will be used in accordance with the definitions set out below. Unless clearly indicated otherwise, use of the terms "a," "an," and the like refers to one or more.

For the purposes of the present description, the term "recycled waste" or "recycled material" is used to indicate a material recovered from both post-consumer waste and industrial waste, as opposed to virgin polymers. Post-consumer waste refers to objects having completed at least a first use cycle (or life cycle), i.e. having already served their first purpose. In contrast to that, industrial waste refers to manufacturing scrap, respectively conversion scrap, which does not normally reach a consumer.

The term "virgin" denotes the newly produced materials and/or objects prior to their first use, which have not already been recycled. Virgin materials and post-consumer materials can be differentiated easily based on absence or presence of contaminants such as limonene and/or fatty acids and/or paper and/or wood. Polypropylene-polyethylene blends can also be differentiated with respect to their origin by presence of polystyrene and/or polyamide. Residual content denotes a content above the detection limit.

A polymer blend is a mixture of two or more polymeric components. In general, the blend can be prepared by mixing the two or more polymeric components. A suitable mixing procedures known in the art is post-polymerization blending. Post-polymerization blending can be dry blending of polymeric components such as polymer powders and/or compounded polymer pellets or melt blending by melt mixing the polymeric components.

Many different kinds of polyethylene or polypropylene can be present in "recycled material".

A propylene random copolymer is a copolymer of propylene monomer units and comonomer units in which the comonomer units are distributed randomly over the polypropylene chain. "Polypropylene-polyethylene blend" refers to a composition containing both polypropylene and polyethylene including also propylene copolymers as well as ethylene copolymers. As a direct determination of each of these components is not possible, the content of polypropylene and polyethylene, as defined in the present invention are determined from the C2 and C3 content, as determined by calibration with iPP and HDPE.

The term "plastomer" denotes a natural or synthetic polymer having both elastic and plastic properties.

The term "XCS" refers to the xylene cold soluble content (XCS wt.-%) determined at 25° C. according to ISO 16152.

The term "XCI" refers to the xylene cold insoluble content (XCI wt.-%) determined at 25° C. according to ISO 16152.

If not indicated otherwise "%" refers to weight-%.

A heterophasic propylene copolymer having as matrix a propylene homopolymer and being produced in the presence of a metallocene catalyst is featured by a melting temperature of below 160° C. but above 150° C. Further a heterophasic propylene copolymer having as matrix a propylene homopolymer and being produced in the presence of a metallocene catalyst comprises 2,1 regiodefects in the matrix phase. In contrast thereto heterophasic propylene copolymers having as matrix a propylene homopolymer and being produced in the presence of a Ziegler-Natta catalyst have a much higher melting temperature, i.e. above 160° C., and do not show 2,1 regiodefects.

The presence of a heterophasic nature can be easily determined by the number of glass transition points. Reactor blend is a blend originating from the production in two or more reactors coupled in series or in a reactor having two or more reaction compartments. A reactor blend may alternatively result from blending in solution. A reactor blend stands in contrast to a compound as produced by melt extrusion.

DETAILED DESCRIPTION

The Composition

As stated above the inventive composition must comprise the heterophasic composition (HECO), the polypropylene-polyethylene blend (B), the plastomer (P), the talc (T) and optionally the high density polyethylene (HDPE). It is especially preferred that the inventive composition consists of the before mentioned components and optionally further additives. However, the inventive composition shall preferably not contain further polymers.

Accordingly, the inventive composition preferably comprises
(A) 18.0 to 60.0 wt.-%, based on the total composition, of a heterophasic composition (HECO);
(B) 7.0 to 55.0 wt.-%, based on the total composition, of a polypropylene-polyethylene blend (B);
(C) 0.0 to 12.0 wt.-%, based on the total composition, of a high density polyethylene (HDPE);
(D) 5.0 to 15.0 wt.-%, based on the total composition of polyethylene being the sum of said high density polyethylene (HDPE) and polyethylene contained in said polypropylene-polyethylene blend (B);
(E) 2.0 to 12.0 wt.-%, based on the total composition, of plastomer (P); and
(F) 7.0 to 25.0 wt.-%, based on the total composition, of talc (T);
wherein
the heterophasic composition (HECO), the polypropylene-polyethylene blend (B), the high density polyethylene (HDPE), the plastomer (P) and the talc (T) make up together at least 90 wt.-%, preferably at least 90.0 wt.-%, of the total composition.

Accordingly, it is especially preferred that the inventive composition comprises
(A) 18.0 to 60.0 wt.-%, based on the total composition, of a heterophasic composition (HECO);
(B) 7.0 to 55.0 wt.-%, based on the total composition, of a polypropylene-polyethylene blend (B);
(C) 2.0 to 12.0 wt.-%, based on the total composition, of a high density polyethylene (HDPE);

(D) 5.0 to 15.0 wt.-%, based on the total composition of polyethylene being the sum of said high density polyethylene (HDPE) and polyethylene contained in said polypropylene-polyethylene blend (B);
(E) 2.0 to 12.0 wt.-%, based on the total composition, of plastomer (P); and
(F) 7.0 to 25.0 wt.-%, based on the total composition, of talc (T);
wherein
the heterophasic composition (HECO), the polypropylene-polyethylene blend (B), the high density polyethylene (HDPE), the plastomer (P) and the talc (T) make up together at least 90 wt.-%, preferably at least 95 wt.-%, of the total composition.

Still more preferably the inventive composition consists of
(A) 18.0 to 60.0 wt.-%, based on the total composition, of a heterophasic composition (HECO);
(B) 7.0 to 55.0 wt.-%, based on the total composition, of a polypropylene-polyethylene blend (B);
(C) 0.0 to 12.0 wt.-%, based on the total composition, of a high density polyethylene (HDPE);
(D) 5.0 to 15.0 wt.-%, based on the total composition of polyethylene being the sum of said high density polyethylene (HDPE) and polyethylene contained in said polypropylene-polyethylene blend (B);
(E) 2.0 to 12.0 wt.-%, based on the total composition, of plastomer (P);
(F) 7.0 to 25.0 wt.-%, based on the total composition, of talc (T); and
(G) 1.0 to 5.0 wt.-%, based on the total composition, of additives (A).

Still yet more preferably the inventive composition consists of
(A) 18.0 to 60.0 wt.-%, based on the total composition, of a heterophasic composition (HECO);
(B) 7.0 to 55.0 wt.-%, based on the total composition, of a polypropylene-polyethylene blend (B);
(C) 2.0 to 12.0 wt.-%, based on the total composition, of a high density polyethylene (HDPE);
(D) 5.0 to 15.0 wt.-%, based on the total composition of polyethylene being the sum of said high density polyethylene (HDPE) and polyethylene contained in said polypropylene-polyethylene blend (B);
(E) 2.0 to 12.0 wt.-%, based on the total composition, of plastomer (P);
(F) 7.0 to 25.0 wt.-%, based on the total composition, of talc (T); and
(G) 1.0 to 5.0 wt.-%, based on the total composition, of additives (A).

Preferably, the composition according to this invention has a melt flow rate $MFR_2$ (230° C., 2.16 kg), measured according to ISO 1133, in the range from 10.0 to 30.0 g/10 min.

Therefore it is preferred that the inventive composition has a melt flow rate $MFR_2$ (230° C., 2.16 kg), measured according to ISO 1133, in the range from 10.0 to 30.0 g/10 min and comprises
(A) 18.0 to 60.0 wt.-%, based on the total composition, of a heterophasic composition (HECO);
(B) 7.0 to 55.0 wt.-%, based on the total composition, of a polypropylene-polyethylene blend (B);
(C) 0.0 to 12.0 wt.-%, preferably 2 to 12 wt.-%, based on the total composition, of a high density polyethylene (HDPE);
(D) 5.0 to 15.0 wt.-%, based on the total composition of polyethylene being the sum of said high density polyethylene (HDPE) and polyethylene contained in said polypropylene-polyethylene blend (B);
(E) 2.0 to 12.0 wt.-%, based on the total composition, of plastomer (P); and
(F) 7.0 to 25.0 wt.-%, based on the total composition, of talc (T);
wherein
the heterophasic composition (HECO), the polypropylene-polyethylene blend (B), the high density polyethylene (HDPE), the plastomer (P) and the talc (T) make up together at least 90 wt.-% of the total composition and
optionally the weight ratio between the first heterophasic composition (HECO) and the polypropylene-polyethylene blend (B) [(HECO)/(B)] is in the range from 0.2 to 8.0, preferably from 0.3 to 6.0.

Yet more preferably the inventive composition has a melt flow rate $MFR_2$ (230° C., 2.16 kg), measured according to ISO 1133, in the range from 10.0 to 30.0 g/10 min and consists of
(A) 18.0 to 60.0 wt.-%, based on the total composition, of the heterophasic composition (HECO);
(B) 7.0 to 55.0 wt.-%, based on the total composition, of the polypropylene-polyethylene blend (B);
(C) 2.0 to 12.0 wt.-%, based on the total composition, of the high density polyethylene (HDPE);
(D) 5.0 to 15.0 wt.-%, based on the total composition of polyethylene being the sum of said high density polyethylene (HDPE) and polyethylene contained in said polypropylene-polyethylene blend (B);
(E) 2.0 to 12.0 wt.-%, based on the total composition, of the plastomer (P);
(F) 7.0 to 25.0 wt.-%, based on the total composition, of talc (T); and
(G) 1.0 to 5.0 wt.-%, based on the total composition, of additives (A);
wherein optionally the weight ratio between the heterophasic composition (HECO) and the polypropylene-polyethylene blend (B) [(HECO)/(B)] is in the range from 0.2 to 8.0, preferably from 0.3 to 6.0.

Still yet more preferably the inventive composition comprises
(A) 16.0 to 60.0 wt.-%, based on the total composition, of a heterophasic composition (HECO);
(B) 7.0 to 55.0 wt.-%, based on the total composition, of a polypropylene-polyethylene blend (B);
(C) 0.0 to 12.0 wt.-%, preferably 2 to 12 wt.-%, based on the total composition, of a high density polyethylene (HDPE);
(D) 5.0 to 15.0 wt.-%, based on the total composition of polyethylene being the sum of said high density polyethylene (HDPE) and polyethylene contained in said polypropylene-polyethylene blend (B);
(E) 2.0 to 12.0 wt.-%, based on the total composition, of plastomer (P); and
(F) 7.0 to 25.0 wt.-%, based on the total composition, of talc (T);
wherein
the heterophasic composition (HECO), the polypropylene-polyethylene blend (B), the high density polyethylene (HDPE), the plastomer (P) and the talc (T) make up together at least 90 wt.-% of the total composition, and
the weight ratio between the heterophasic composition (HECO) and the polypropylene-polyethylene blend (B) [(HECO)/(B)] is in the range from 0.2 to 8.0, preferably from 0.3 to 6.0, wherein further the composition has
a melt flow rate MFR$_2$ (230° C., 2.16 kg), measured according to ISO 1133, in the range from 10.0 to 30.0 g/10 min;
flexural modulus measured according to according to ISO 178 in the range from 1600 to 2400 MPa;
a Charpy notched impact strength (NIS) was measured according to ISO 179 1 eA at +23° C. in the range from 4.5 to 45.0 kJ/m$^2$, preferably 5.0 to 40.0 kJ/m$^2$; and
Charpy notched impact strength (NIS) was measured according to ISO 179 1 eA at −20° C. in the range from 1.8 to 8.0 kJ/m$^2$, preferably 2.0 to 7.0 kJ/m$^2$.

It is in particular preferred that the composition of the present invention consists of
(A) 16.0 to 60.0 wt.-%, based on the total composition, of a heterophasic composition (HECO);
(B) 7.0 to 55.0 wt.-%, based on the total composition, of a polypropylene-polyethylene blend (B);
(C) 2.0 to 12.0 wt.-%, based on the total composition, of a high density polyethylene (HDPE);
(D) 5.0 to 15.0 wt.-%, based on the total composition of polyethylene being the sum of said high density polyethylene (HDPE) and polyethylene contained in said polypropylene-polyethylene blend (B);
(E) 2.0 to 12.0 wt.-%, based on the total composition, of plastomer (P);
(F) 7.0 to 25.0 wt.-%, based on the total composition, of talc (T); and
(G) 1.0 to 5.0 wt.-%, based on the total composition, of additives (A);
wherein the weight ratio between the heterophasic composition (HECO) and the polypropylene-polyethylene blend (B) [(HECO)/(B)] is in the range from 0.2 to 8.0, preferably from 0.3 to 6.0,
wherein further the composition has
a melt flow rate MFR$_2$ (230° C., 2.16 kg), measured according to ISO 1133, in the range from 10.0 to 30.0 g/10 min;
flexural modulus measured according to according to ISO 178 in the range from 1600 to 2400 MPa;
a Charpy notched impact strength (NIS) was measured according to ISO 179 1 eA at +23° C. in the range from 4.5 to 45.0 kJ/m$^2$, preferably 5.0 to 40 kJ/m$^2$; and
Charpy notched impact strength (NIS) was measured according to ISO 179 1 eA at −20° C. in the range from 1.8 to 8.0 kJ/m$^2$, preferably 2.0 to 7.0 kJ/m$^2$.

The composition according to the present invention may be prepared by compounding the components within suitable melt mixing devices for preparing polymeric compounds, including in particular extruders, like single screw extruders as well as co- or counter-rotating twin-screw extruders. Other suitable melt mixing devices include planet extruders and single screw co-kneaders. Especially preferred are co-rotating twin-screw extruders including high intensity mixing and kneading sections. Suitable melt temperatures for preparing the compositions are in the range from 170 to 300° C., preferably in the range from 200 to 260° C.

The composition according to the present invention, in particular the composition as described in the preceding embodiments, is preferably characterised by a low VOC emission value, as measured according to VDA278, of less than 100 μg per gram of composition, more preferably in the range from 10 to 90 μg per gram of composition, most preferably in the range from 15 to 75 μg per gram of composition.

The composition according to the present invention, in particular the composition as described in the preceding embodiments, is furthermore preferably characterised by a low FOG emission value, as measured according to VDA278, of less than 320 μg per gram of composition, more preferably in the range from 25 to 300 μg per gram of composition, most preferably in the range from 30 to 280 μg per gram of composition.

In the following, the components present in the inventive composition are described in more detail.

The Heterophasic Propylene Copolymer (HECO)

The heterophasic propylene copolymer (HECO) is a heterophasic system as understood by the person skilled in the art. That is, the heterophasic propylene copolymer (HECO) comprises a matrix being a propylene homopolymer in which an ethylene-propylene rubber is dispersed. In other words, the expression "heterophasic" indicates that an ethylene-propylene rubber is (finely) dispersed in the matrix. In other words the ethylene-propylene rubber forms inclusions in the matrix. Thus, the matrix contains (finely) dispersed inclusions being not part of the matrix and said inclusions are the ethylene-propylene rubber. The term "inclusion" according to this invention shall preferably indicate that the matrix and the inclusion form different phases within the heterophasic propylene copolymer, said inclusions are for instance visible by high resolution microscopy, like electron microscopy or scanning force microscopy.

The heterophasic propylene copolymer (HECO) according to this invention has been produced by a metallocene catalyst, especially by a metallocene catalyst as defined in more detail below. Accordingly, the heterophasic propylene copolymer (HECO) according to this invention has a melting temperature Tm, measured by DSC according to ISO 11357-3 (heating and cooling rate 10° C./min) in the range from 150 to 159° C., preferably in the range from 153 to 158° C., and/or 2,1 regiodefects in the matrix, i.e. the propylene homopolymer, in the range from 0.05 to 0.90%, preferably in the range from 0.25 to 0.85, determined by $^{13}$C-NMR.

Furthermore, the heterophasic propylene copolymer (HECO) according to this invention is featured by a rather low ethylene content. Ethylene is the sole comonomer in the heterophasic propylene copolymer (HECO). Accordingly the total ethylene content of the heterophasic propylene copolymer (HECO), measured by Fourier Transform Infra-red Spectroscopy (FTIR) during CRYSTEX analysis, is in the range from 1.5 to 6.5 mol-%, more preferably in the range from 1.7 to 6.0 mol-%, like in the range from 1.9 to 5.8 mol.-%, wherein ethylene is the sole comonomer in the heterophasic composition (HECO).

In addition the heterophasic propylene copolymer (HECO) according to this invention is further characterized by a rather low amount of ethylene-propylene rubber, which is reflected by the rather low amount of soluble fraction (SF) measured by CRYSTEX analysis. That is the heterophasic propylene copolymer (HECO) according to this invention has
(a) a crystalline fraction (CF), determined according to CRYSTEX QC method ISO 6427 Annex B, present in an amount in the range from 79.0 to 91.0 wt.-%, preferably in the range from 80.5 to 90.5 wt.-%, like in the range from 81.0 to 90.0 wt.-%, relative to the total weight of the heterophasic propylene copolymer (HECO); and
(b) a soluble fraction (SF), determined according to CRYSTEX QC method ISO 6427 Annex B, present in an amount in the range from 9.0 to 21.0 wt.-%, preferably in the range from 9.5 to 19.5 wt.-%, like in the range from 10.0 to 19.0 wt.-%, relative to the total weight of the heterophasic propylene copolymer (HECO).

The crystalline fraction (CF) is dominated by the matrix, i.e. by the propylene homopolymer of the heterophasic composition (HECO) whereas the soluble faction (SF) is dominated by the rubber component, i.e. by the ethylene-propylene rubber, of the heterophasic composition (HECO). Accordingly it is preferred that the heterophasic composition (HECO) comprises (a) 79.0 to 91.0 wt.-%, more preferably 80.5 to 90.5 wt.-%, based on the total heterophasic composition (HECO), of the propylene homopolymer; and (b) 9.0 to 21.0 wt.-%, more preferably 9.5 to 19.5 wt.-%, based on the total heterophasic composition (HECO), of the ethylene propylene rubber.

In addition the heterophasic composition (HECO) has a melt flow rate $MFR_2$ (230° C., 2.16 kg), measured according to ISO 1133, in the range from 20.0 to 120 g/10 min.

Further it is preferred that the ethylene content of the soluble fraction (C2(SF)) of the heterophasic composition (HECO), measured by Fourier Transform Infrared Spectroscopy (FTIR) during CRYSTEX analysis, is in the range from 22.0 to 39.0 mol-%, more preferably in the range from 25.0 to 35.0 mol-%.

Still further the ethylene content of the crystalline fraction (C2(CF)) of the heterophasic composition (HECO), measured by Fourier Transform Infrared Spectroscopy (FTIR) during CRYSTEX analysis, is in the range from 0.0 to 0.7 mol-%, more preferably in the range from 0.0 to 0.5 mol-%.

It is additionally preferred that the matrix and the rubber, i.e. the crystalline fraction (CF) and the soluble fraction (SF) have a specific molecular weight. Accordingly it is preferred that (i) the intrinsic viscosity of the soluble fraction (IV(SF)) of the heterophasic composition (HECO), measured according to ISO 1628-1 (at 135° C. in decalin), is in the range from 1.80 to 3.20 dl/g, more preferably in the range from 2.00 to 3.00 dl/g, like in the range from 2.20 to 2.80 dl/g;

(ii) the intrinsic viscosity of the crystalline fraction (IV (CF)) of the heterophasic composition (HECO), measured according to ISO 1628-1 (at 135° C. in decalin), is in the range from 0.80 to 1.80 dl/g, more preferably in the range from 1.00 to 1.60 dl/g; and (iii) a ratio between the intrinsic viscosity of the soluble fraction (SF) and the intrinsic viscosity of the crystalline fraction (CF) [IV(SF)/IV(CF)] of the heterophasic composition (HECO) is in the range from 1.50 to 2.80, more preferably in the range from 1.60 to 2.70, like in the range from 1.70 to less than 2.60.

Accordingly the heterophasic composition (HECO) comprises (a) a propylene homopolymer as the matrix, and (b) an ethylene-propylene rubber being dispersed in said matrix, wherein the heterophasic propylene copolymer (HECO) has (i) a melting temperature Tm, measured by DSC according to ISO 11357-3 (heating and cooling rate 10° C./min), in the range from 150 to 159° C.;

(ii) a melt flow rate $MFR_2$ (230° C., 2.16 kg), measured according to ISO 1133, in the range from 20.0 to 120 g/10 min;

(iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);

(iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and (v) a total ethylene content, measured by Fourier Transform Infrared Spectroscopy (FTIR) during CRYSTEX analysis, in the range from 1.5 to 6.5 mol.-%.

In a preferred embodiment the heterophasic composition (HECO) comprises (a) a propylene homopolymer as the matrix, and (b) an ethylene-propylene rubber being dispersed in said matrix, wherein the heterophasic propylene copolymer (HECO) has (i) a melting temperature Tm, measured by DSC according to ISO 11357-3 (heating and cooling rate 10° C./min), in the range from 150 to 159° C.;

(ii) a melt flow rate $MFR_2$ (230° C., 2.16 kg), measured according to ISO 1133, in the range from 20.0 to 120 g/10 min;

(iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);

(iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and (v) a total ethylene content, measured by Fourier Transform Infrared Spectroscopy (FTIR) during CRYSTEX analysis, in the range from 1.5 to 6.5 mol.-%;

(vi) an ethylene content of the soluble fraction (C2(SF)), measured by Fourier Transform Infrared Spectroscopy (FTIR) during CRYSTEX analysis, is in the range from 22.0 to 39.0 mol-%, and optionally (vii) an ethylene content of the crystalline fraction (C2 (CF)), measured by Fourier Transform Infrared Spectroscopy (FTIR) during CRYSTEX analysis, is in the range from 0.0 to 0.7 mol-%.

In a still more preferred embodiment the heterophasic composition (HECO) comprises (a) a propylene homopolymer as the matrix, wherein the propylene homopolymer has 2,1 regiodefects, determined by $^{13}$C-NMR, in the range from 0.05 to 0.90%, and (b) an ethylene-propylene rubber being dispersed in said matrix, wherein the heterophasic propylene copolymer (HECO) has (i) a melting temperature Tm, measured by DSC according to ISO 11357-3 (heating and cooling rate 10° C./min), in the range from 150 to 159° C.;

(ii) a melt flow rate $MFR_2$ (230° C., 2.16 kg), measured according to ISO 1133, in the range from 20.0 to 120 g/10 min;

(iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);

(iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and
(v) a total ethylene content, measured by Fourier Transform Infrared Spectroscopy (FTIR) during CRYSTEX analysis, in the range from 1.5 to 6.5 mol.-%;
(viii) an ethylene content of the soluble fraction (C2(SF)), measured by Fourier Transform Infrared Spectroscopy (FTIR) during CRYSTEX analysis, is in the range from 22.0 to 39.0 mol-%, and optionally
(ix) an ethylene content of the crystalline fraction (C2 (CF)), measured by Fourier Transform Infrared Spectroscopy (FTIR) during CRYSTEX analysis, is in the range from 0.0 to 0.7 mol-%.

In a yet more preferred embodiment the heterophasic composition (HECO) comprises
(a) a propylene homopolymer as the matrix, and
(b) an ethylene-propylene rubber being dispersed in said matrix,
wherein the heterophasic propylene copolymer (HECO) has
(i) a melting temperature Tm, measured by DSC according to ISO 11357-3 (heating and cooling rate 10° C./min), in the range from 150 to 159° C.;
(ii) a melt flow rate $MFR_2$ (230° C., 2.16 kg), measured according to ISO 1133, in the range from 20.0 to 120 g/10 min;
(iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);
(iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO);
(v) the intrinsic viscosity of the soluble fraction (IV(SF)) of the heterophasic composition (HECO), measured according to ISO 1628-1 (at 135° C. in decalin), is in the range from 1.80 to 3.20 dl/g;
(vi) the intrinsic viscosity of the crystalline fraction (IV(CF)) of the heterophasic composition (HECO) is in the range from 0.80 to 1.80 dl/g;
(vii) a ratio between the intrinsic viscosity of the soluble fraction (SF) and the intrinsic viscosity of the crystalline fraction (CF) [IV(SF)/IV(CF)] of the heterophasic composition (HECO) is in the range from 1.50 to 2.80;
(viii) a total ethylene content, measured by Fourier Transform Infrared Spectroscopy (FTIR) during CRYSTEX analysis, in the range from 1.5 to 6.5 mol.-%;
(ix) an ethylene content of the soluble fraction (C2(SF)), measured by Fourier Transform Infrared Spectroscopy (FTIR) during CRYSTEX analysis, is in the range from 22.0 to 39.0 mol-%, and optionally
(x) an ethylene content of the crystalline fraction (C2 (CF)), measured by Fourier Transform Infrared Spectroscopy (FTIR) during CRYSTEX analysis, is in the range from 0.0 to 0.7 mol-%.

In a still yet more preferred embodiment the heterophasic composition (HECO) comprises
(a) a propylene homopolymer as the matrix, wherein the propylene homopolymer has 2,1 regiodefects, determined by $^{13}$C-NMR, in the range from 0.05 to 0.90%, and
(b) an ethylene-propylene rubber being dispersed in said matrix,
wherein the heterophasic propylene copolymer (HECO) has
(i) a melting temperature Tm, measured by DSC according to ISO 11357-3 (heating and cooling rate 10° C./min), in the range from 150 to 159° C.;
(ii) a melt flow rate $MFR_2$ (230° C., 2.16 kg), measured according to ISO 1133, in the range from 20.0 to 120 g/10 min;
(iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);
(iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO);
(v) the intrinsic viscosity of the soluble fraction (IV(SF)) of the heterophasic composition (HECO), measured according to ISO 1628-1 (at 135° C. in decalin), is in the range from 1.80 to 3.20 dl/g;
(vi) the intrinsic viscosity of the crystalline fraction (IV(CF)) of the heterophasic composition (HECO), measured according to ISO 1628-1 (at 135° C. in decalin), is in the range from 0.80 to 1.80 dl/g;
(vii) a ratio between the intrinsic viscosity of the soluble fraction (SF) and the intrinsic viscosity of the crystalline fraction (CF) [IV(SF)/IV(CF)] of the heterophasic composition (HECO) is in the range from 1.50 to 2.80;
(viii) a total ethylene content, measured by Fourier Transform Infrared Spectroscopy (FTIR) during CRYSTEX analysis, in the range from 1.5 to 6.5 mol.-%;
(ix) an ethylene content of the soluble fraction (C2(SF)), measured by Fourier Transform Infrared Spectroscopy (FTIR) during CRYSTEX analysis, is in the range from 22.0 to 39.0 mol-%, and optionally
(x) an ethylene content of the crystalline fraction (C2 (CF)), measured by Fourier Transform Infrared Spectroscopy (FTIR) during CRYSTEX analysis, is in the range from 0.0 to 0.7 mol-%.

In a specific embodiment the heterophasic composition (HECO) comprises
(a) a propylene homopolymer as the matrix, wherein the propylene homopolymer has 2,1 regiodefects, determined by $^{13}$C-NMR, in the range from 0.05 to 0.90%, and
(b) an ethylene-propylene rubber being dispersed in said matrix,
wherein the heterophasic propylene copolymer (HECO) has
(i) a melting temperature Tm, measured by DSC according to ISO 11357-3 (heating and cooling rate 10° C./min), in the range from 150 to 159° C.;
(ii) a melt flow rate $MFR_2$ (230° C., 2.16 kg), measured according to ISO 1133, in the range from 20.0 to 120 g/10 min;
(iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);
(iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO);
(v) the intrinsic viscosity of the soluble fraction (IV(SF)) of the heterophasic composition (HECO), measured according to ISO 1628-1 (at 135° C. in decalin), is in the range from 1.80 to 3.20 dl/g;
(vi) the intrinsic viscosity of the crystalline fraction (IV(CF)) of the heterophasic composition (HECO), measured according to ISO 1628-1 (at 135° C. in decalin), is in the range from 0.80 to 1.80 dl/g;
(vii) a ratio between the intrinsic viscosity of the soluble fraction (SF) and the intrinsic viscosity of the crystalline fraction (CF) [IV(SF)/IV(CF)] of the heterophasic composition (HECO) is in the range from 1.50 to 2.80;
(viii) a total ethylene content, measured by Fourier Transform Infrared Spectroscopy (FTIR) during CRYSTEX analysis, in the range from 1.5 to 6.5 mol.-%;
(ix) an ethylene content of the soluble fraction (C2(SF)), measured by Fourier Transform Infrared Spectroscopy (FTIR) during CRYSTEX analysis, is in the range from 22.0 to 39.0 mol-%, and optionally
(x) an ethylene content of the crystalline fraction (C2 (CF)), measured by Fourier Transform Infrared Spectroscopy (FTIR) during CRYSTEX analysis, is in the range from 0.0 to 0.7 mol-%.

In a very specific embodiment the heterophasic composition (HECO) comprises
(a) a propylene homopolymer as the matrix, wherein the propylene homopolymer has 2,1 regiodefects, determined by $^{13}$C-NMR, in the range from 0.05 to 0.90%, and
(b) an ethylene-propylene rubber being dispersed in said matrix,
wherein the heterophasic propylene copolymer (HECO) has
(i) a melting temperature Tm, measured by DSC according to ISO 11357-3 (heating and cooling rate 10° C./min), in the range from 153 to 158° C.;
(ii) a melt flow rate $MFR_2$ (230° C., 2.16 kg), measured according to ISO 1133, in the range from 20.0 to 120 g/10 min;
(iii) a crystalline fraction (CF), determined according to CRYSTEX QC method ISO 6427 Annex B, present in an amount in the range from 80.5 to 90.5 wt.-%, relative to the total weight of the heterophasic propylene copolymer (HECO);
(iv) a soluble fraction (SF), determined according to CRYSTEX QC method ISO 6427 Annex B, present in an amount in the range from 9.5 to 19.5 wt.-%, relative to the total weight of the heterophasic propylene copolymer (HECO);
(v) the intrinsic viscosity of the soluble fraction (IV(SF)) of the heterophasic composition (HECO), measured according to ISO 1628-1 (at 135° C. in decalin), is in the range from 2.30 to 2.80 dl/g;
(vi) the intrinsic viscosity of the crystalline fraction (IV(CF)) of the heterophasic composition (HECO), measured according to ISO 1628-1 (at 135° C. in decalin), is in the range from 1.00 to 1.40 dl/g;
(vii) a ratio between the intrinsic viscosity of the soluble fraction (SF) and the intrinsic viscosity of the crystalline fraction (CF) [IV(SF)/IV(CF)] of the heterophasic composition (HECO) is in the range from 1.65 to 2.65;
(viii) a total ethylene content, measured by Fourier Transform Infrared Spectroscopy (FTIR) during CRYSTEX analysis, in the range from 1.7 to 4.5 mol.-%;
(ix) an ethylene content of the soluble fraction (C2(SF)), measured by Fourier Transform Infrared Spectroscopy (FTIR) during CRYSTEX analysis, is in the range from 25.0 to 35.0 mol-%, and optionally
(x) an ethylene content of the crystalline fraction (C2 (CF)), measured by Fourier Transform Infrared Spectroscopy (FTIR)Infrared Spectroscopy during CRYSTEX analysis, is in the range from 0.0 to 0.5 mol-%.

In the following, the polymerization of the heterophasic composition (HECO) is described in detail.

The heterophasic composition (HECO) according to this invention can be produced in a reactor cascade of two or more reactors, preferably three reactors. The polymerization processes suitable for producing the heterophasic composition (HECO) according to this invention are known in the state of the art. They comprise at least two polymerization stages, where polymerization is typically carried out in solution, slurry, bulk or gas phase. Typically, the polymerization process comprises additional polymerization stages or reactors. In one particularly preferred embodiment, the polymerization process comprises at least one bulk reactor and optionally at least two gas phase reactors arranged in that order. The process may further comprise pre- and post-reactors. Pre-reactors comprise typically pre-polymerization reactors. In this kind of processes, the use of higher polymerization temperatures is preferred in order to achieve specific properties of the polymer. Typical temperatures in these processes are 65° C. or higher, preferably 75° C. or higher. The higher polymerization temperatures as mentioned before can be applied in some or all reactors of the reactor cascade, preferably in the first gas phase reactor.

A preferred multistage process is a "loop-gas phase"-process, such as developed by Borealis (known as BORSTAR® technology) described e.g. in patent literature, such as in EP 0 887 379, WO 92/12182, WO 2004/000899, WO 2004/111095, WO 99/24478, WO 99/24479 or in WO 00/68315. A further suitable slurry-gas phase process is the Spheripol® process of Basell.

As mentioned above the heterophasic composition (HECO) according to this invention is especially obtained in a polymerization process using a metallocene catalyst having the formula (I)

(I)

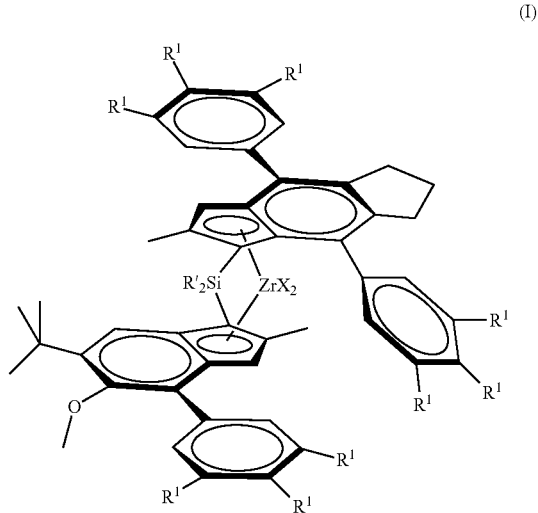

wherein each $R^1$ are independently the same or can be different and are hydrogen or a linear or branched $C_1$-$C_6$ alkyl group, whereby at least on $R^1$ per phenyl group is not hydrogen, R' is a $C_1$-$C_{10}$ hydrocarbyl group, preferably a $C_1$-$C_4$ hydrocarbyl group and more preferably a methyl group and X independently is a hydrogen atom, a halogen atom, $C_1$-$C_6$ alkoxy group, $C_1$-$C_6$ alkyl group, phenyl or benzyl group.

Most preferably, X is chlorine, benzyl or a methyl group. Preferably, both X groups are the same. The most preferred options are two chlorides, two methyl or two benzyl groups, especially two chlorides.

Specific preferred metallocene catalysts of the invention include:

rac-anti-dimethylsilanediyl[2-methyl-4,8-bis-(4'-tert-butylphenyl)-1,5,6,7-tetrahydro-s-indacen-1-yl][2-methyl-4-(3',5'-dimethyl- phenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s-indacen-1-yl] [2-methyl-4-(3',5'-dimethylphenyl)-5-methoxy-6-tert-butylinden-1-yl] zirconium dichloride rac-anti-dimethylsilanediyl[2-methyl-4,8-bis-(3',5'-dimethylphenyl)-1,5,6,7-tetrahydro-s-indacen-1-yl] [2-methyl-4-(3',5'-ditert-butyl-phenyl)-5-methoxy-6-tert-butylinden-1-yl] zirconium dichloride or their corresponding zirconium dimethyl analogues.

The most preferred catalyst is rac-anti-dimethylsilanediyl [2-methyl-4,8-bis-(3',5'-dimethylphenyl)-1,5,6,7-tetrahydros-indacen-1-yl] [2-methyl-4-(3',5'-dimethylphenyl)-5-methoxy-6-tert-butylinden-1-yl] zirconium dichloride (II)

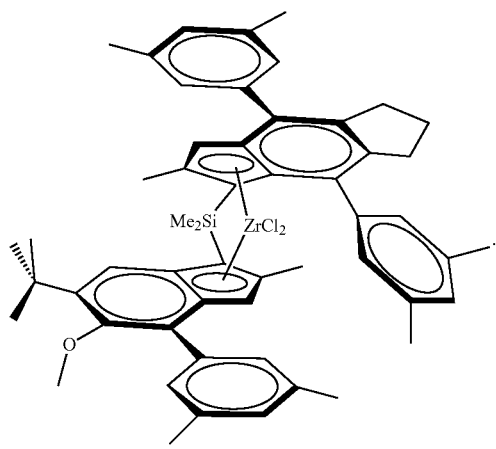

The ligands required to form the complexes and hence catalysts of the invention can be synthesised by any process and the skilled organic chemist would be able to devise various synthetic protocols for the manufacture of the necessary ligand materials. For Example WO2007/116034 discloses the necessary chemistry. Synthetic protocols can also generally be found in WO 2002/02576, WO 2011/135004, WO 2012/084961, WO 2012/001052, WO 2011/076780, WO 2015/158790 and WO 2018/122134. Especially reference is made to WO 2019/179959 in which the most preferred catalyst of the present invention is described. The examples section also provides the person skilled in the art with sufficient direction.

Cocatalyst

To form an active catalytic species it is normally necessary to employ a cocatalyst as is well known in the art.

According to the present invention a cocatalyst system comprising a boron containing cocatalyst and/or an aluminoxane cocatalyst is used in combination with the above defined metallocene catalyst complex.

The aluminoxane cocatalyst can be one of formula (III):

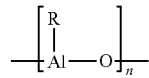

(III)

where n is usually from 6 to 20 and R has the meaning below.

Aluminoxanes are formed on partial hydrolysis of organoaluminum compounds, for example those of the formula $AlR_3$, $AlR_2Y$ and $Al_2R_3Y_3$ where R can be, for example, $C_1$-$C_{10}$ alkyl, preferably $C_1$-$C_5$ alkyl, or $C_3$-$C_{10}$ cycloalkyl, $C_7$-$C_{12}$ arylalkyl or alkylaryl and/or phenyl or naphthyl, and where Y can be hydrogen, halogen, preferably chlorine or bromine, or $C_1$-$C_{10}$ alkoxy, preferably methoxy or ethoxy. The resulting oxygen-containing aluminoxanes are not in general pure compounds but mixtures of oligomers of the formula (III).

The preferred aluminoxane is methylaluminoxane (MAO). Since the aluminoxanes used according to the invention as cocatalysts are not, owing to their mode of preparation, pure compounds, the molarity of aluminoxane solutions hereinafter is based on their aluminium content.

According to the present invention, also a boron containing cocatalyst can be used instead of the aluminoxane cocatalyst or the aluminoxane cocatalyst can be used in combination with a boron containing cocatalyst.

It will be appreciated by the person skilled in the art that where boron based cocatalysts are employed, it is normal to pre-alkylate the complex by reaction thereof with an aluminium alkyl compound, such as TIBA. This procedure is well known and any suitable aluminium alkyl, e.g. Al($C_1$-$C_6$ alkyl)$_3$ can be used. Preferred aluminium alkyl compounds are triethylaluminium, tri-isobutylaluminium, tri-isohexylaluminium, tri-n-octylaluminium and tri-isooctylaluminium.

Alternatively, when a borate cocatalyst is used, the metallocene catalyst complex is in its alkylated version, that is for example a dimethyl or dibenzyl metallocene catalyst complex can be used.

Boron based cocatalysts of interest include those of formula (IV)

$$BY_3 \quad (IV)$$

wherein Y is the same or different and is a hydrogen atom, an alkyl group of from 1 to about 20 carbon atoms, an aryl group of from 6 to about 15 carbon atoms, alkylaryl, arylalkyl, haloalkyl or haloaryl each having from 1 to 10 carbon atoms in the alkyl radical and from 6-20 carbon atoms in the aryl radical or fluorine, chlorine, bromine or iodine. Preferred examples for Y are methyl, propyl, isopropyl, isobutyl or trifluoromethyl, unsaturated groups such as aryl or haloaryl like phenyl, tolyl, benzyl groups, p-fluorophenyl, 3,5-difluorophenyl, pentachlorophenyl, pentafluorophenyl, 3,4,5-trifluorophenyl and 3,5-di(trifluoromethyl) phenyl. Preferred options are trifluoroborane, triphenylborane, tris(4-fluorophenyl)borane, tris(3,5-difluorophenyl)borane, tris(4-fluoromethylphenyl)borane, tris(2,4, 6-trifluorophenyl)borane, tris(penta-fluorophenyl)borane, tris(tolyl)borane, tris(3,5-dimethyl-phenyl)borane, tris(3,5-difluorophenyl)borane and/or tris (3,4,5-trifluorophenyl)borane.

Particular preference is given to tris(pentafluorophenyl) borane.

However it is preferred that borates are used, i.e. compounds containing a borate 3+ ion. Such ionic cocatalysts preferably contain a non-coordinating anion such as tetrakis (pentafluorophenyl)borate and tetraphenylborate. Suitable counterions are protonated amine or aniline derivatives such as methylammonium, anilinium, dimethylammonium, diethylammonium, N-methylanilinium, diphenylammonium, N,N-dimethylanilinium, trimethylammonium, triethylammonium, tri-n-butylammonium, methyldiphenylammonium, pyridinium, p-bromo-N,N-dimethylanilinium or p-nitro-N, N-dimethylanilinium.

Preferred ionic compounds which can be used according to the present invention include:
triethylammoniumtetra(phenyl)borate,
tributylammoniumtetra(phenyl)borate,
trimethylammoniumtetra(tolyl)borate,
tributylammoniumtetra(tolyl)borate,
tributylammoniumtetra(pentafluorophenyl)borate,
tripropylammoniumtetra(dimethylphenyl)borate,
tributylammoniumtetra(trifluoromethylphenyl)borate,
tributylammoniumtetra(4-fluorophenyl)borate,
N,N-dimethylcyclohexylammoniumtetrakis(pentafluorophenyl)borate,
N,N-dimethylbenzylammoniumtetrakis(pentafluorophenyl) borate,
N,N-dimethylaniliniumtetra(phenyl)borate,
N,N-diethylaniliniumtetra(phenyl)borate,
N,N-dimethylaniliniumtetrakis(pentafluorophenyl)borate,
N,N-di(propyl)ammoniumtetrakis(pentafluorophenyl)borate,
di(cyclohexyl)ammoniumtetrakist(pentafluorophenyl)borate,
triphenylphosphoniumtetrakis(phenyl)borate,
triethylphosphoniumtetrakis(phenyl)borate,
diphenylphosphoniumtetrakis(phenyl)borate,
tri(methylphenyl)phosphoniumtetrakis(phenyl)borate,
tri(dimethylphenyl)phosphoniumtetrakis(phenyl)borate,
triphenylcarbeniumtetrakis(pentafluorophenyl)borate,
or ferroceniumtetrakis(pentafluorophenyl)borate.

Preference is given to triphenylcarbeniumtetrakis(pentafluorophenyl) borate, N,N-dimethylcyclohexylammoniumtetrakis(pentafluorophenyl)borate or N,N-dimethylbenzylammoniumtetrakis(pentafluorophenyl)borate.

It has been surprisingly found that certain boron cocatalysts are especially preferred. Preferred borates of use in the invention therefore comprise the trityl ion. Thus the use of N,N-dimethylammonium-tetrakispentafluorophenylborate and $Ph_3CB(PhF_5)_4$ and analogues therefore are especially favoured.

According to the present invention, the preferred cocatalysts are aluminoxanes, more preferably methylaluminoxanes, combinations of aluminoxanes with Al-alkyls, boron or borate cocatalysts, and combination of aluminoxanes with boron-based cocatalysts.

Suitable amounts of cocatalyst will be well known to the person skilled in the art. The molar ratio of boron to the metal ion of the metallocene may be in the range 0.5:1 to 10:1 mol/mol, preferably 1:1 to 10:1, especially 1:1 to 5:1 mol/mol.

The molar ratio of Al in the aluminoxane to the metal ion of the metallocene may be in the range 1:1 to 2000:1 mol/mol, preferably 10:1 to 1000:1, and more preferably 50:1 to 500:1 mol/mol.

The catalyst can be used in supported or unsupported form, preferably in supported form. The particulate support material used is preferably an organic or inorganic material, such as silica, alumina or zirconia or a mixed oxide such as silica-alumina, in particular silica, alumina or silica-alumina. The use of a silica support is preferred. The person skilled in the art is aware of the procedures required to support a metallocene catalyst.

Especially preferably, the support is a porous material so that the complex may be loaded into the pores of the support, e.g. using a process analogous to those described in WO94/14856 (Mobil), WO95/12622 (Borealis) and WO2006/097497.

The average particle size of the silica support can be typically from 10 to 100 μm. However, it has turned out that special advantages can be obtained if the support has an average particle size from 15 to 80 μm, preferably from 18 to 50 μm.

The average pore size of the silica support can be in the range 10 to 100 nm and the pore volume from 1 to 3 mL/g.

Examples of suitable support materials are, for instance, ES757 produced and marketed by PQ Corporation, Sylopol 948 produced and marketed by Grace or SUNSPERA DM-L-303 silica produced by AGC Si-Tech Co. Supports can be optionally calcined prior to the use in catalyst preparation in order to reach optimal silanol group content.

The use of these supports is routine in the art.

The Polypropylene-Polyethylene Blend (B)

The polypropylene-polyethylene blend (B) according to the present invention comprises
B-1) at least 85.0 wt.-%, relative to the total weight of the polypropylene-polyethylene blend (B), of polypropylene,
B-2) at most 15.0 wt.-%, relative to the total weight of the polypropylene-polyethylene blend (B), of polyethylene,
Simultaneously the polypropylene-polyethylene blend (B) has
a melt flow rate $MFR_2$ (230° C., 2.16 kg), measured according to ISO 1133, in the range from 5.0 to 75 g/10 min, preferably 7.0 to 50 g/10 min, more preferably 9.0 to 30 g/10 min; and
a residual ash content in the range from 0.1 to 3.0 wt.-%, preferably 0.5 to 2.7 wt.-%, more preferably 0.7 to 2.5 wt.-%.

The polypropylene-polyethylene blend (B) according to present invention is preferably a recycled material. It is particularly preferred that the polypropylene-polyethylene blend (B) according to present invention originates in an amount of at least 90 wt.-% from post-consumer and/or post industrial waste, more preferably from post-consumer waste.

The polypropylene-polyethylene blend (B) according to present invention may have one or more of the following properties
a) a content of limonene as determined by using solid phase microextraction (HS-SPME-GC-MS) of from 0.1 ppm to 100 ppm, preferably from 0.1 ppm to 50 ppm, more preferably from 0.1 ppm to 20 ppm, most preferably from 0.1 ppm to 5 ppm;

b) a content of fatty acid(s) as determined by using solid phase microextraction (HS-SPME-GC-MS) of 0.1 to 100 ppm;
c) a content of polyamide(s) as determined by NMR of 0 to 1.5 wt.-%;
d) a content of polystyrene(s) as determined by NMR of 0.05 to 3.0 wt.-%;
e) a residual ash content as mentioned above.

It should be understood that the polypropylene-polyethylene blend (B) may vary broadly in composition, i.e. may include propylene homopolymers, propylene copolymers, ethylene homopolymers, and ethylene copolymers. As a direct determination of each of these components is not possible, the content of polypropylene and polyethylene, as defined in the present invention are determined from the C2 and C3 content, as determined by calibration with iPP and HDPE.

Conventionally the polypropylene-polyethylene blend (B) according to the present invention may also have one or more of the following properties:
  residual content of PET determined as described in the experimental part;
  residual talc and chalk content as described in the experimental part;
  residual content of metals (determined by x ray fluorescence (XRF)
  residual amount of paper as described in the experimental part
  residual amount of wood as described in the experimental part.

The polypropylene-polyethylene blend (B) according to the present invention is preferably obtained from washing and/or aeration steps as known in the art.

The Plastomer

The composition according to this invention additionally comprises a plastomer being an ethylene 1-octene copolymer or an ethylene 1-butene copolymer having a density, measured according to ISO 1183-1, in the range from 850 to 900 kg/m$^3$, preferably in the range from 860 to 890 kg/m$^2$.

Preferably, the plastomer has a melt flow rate $MFR_2$ (190° C., 2.16 kg), measured according to ISO 1133, in the range from 1.5 to 15.0 g/10 min, preferably in the range from 2.0 to 10.0 g/10 min.

It is especially preferred that the plastomer is an ethylene 1-octene copolymer having a density, measured according to ISO 1183-1, in the range from 850 to 900 kg/m$^3$ and a melt flow rate $MFR_2$ (190° C., 2.16 kg), measured according to ISO 1133, in the range from 1.5 to 15.0 g/10 min.

According to one embodiment, the plastomer is an ethylene 1-octene copolymer having a density, measured according to ISO 1183-1, in the range from 860 to 890 kg/m$^3$ and a melt flow rate $MFR_2$ (190° C., 2.16 kg), measured according to ISO 1133, in the range from 2.0 to 10.0 g/10 min.

In one preferred embodiment, the plastomer is prepared with at least one metallocene catalyst. The plastomer may also be prepared with more than one metallocene catalyst or may be a blend of multiple elastomers prepared with different metallocene catalysts. In some embodiments, the plastomer is a substantially linear ethylene polymer (SLEP). SLEPs and other metallocene catalyzed plastomers are known in the art, for example, U.S. Pat. No. 5,272,236. These resins are also commercially available, for example, as Queo™ plastomers available from Borealis AG (Austria), ENGAGE™ plastomer resins available from Dow Chemical Co. (USA) or EXACT™ polymers from ExxonMobil (USA) or TAFMER™ polymers from Mitsui (Japan).

The High Density Polyethylene (HDPE)

According to a preferred embodiment of the present invention, the composition further comprises a high density polyethylene (HDPE).

The high density polyethylene (HDPE) has preferably a density, measured according to ISO 1183-1, in the range from 940 to 970 kg/m$^3$.

Additionally, it is preferred that the high density polyethylene (HDPE) has a rather low melt flow rate. Accordingly, the melt flow rate $MFR_2$ (190° C., 2.16 kg), measured according to ISO 1133, of the high density polyethylene (HDPE) is preferably in the range from 1.0 to 30.0 g/10 min, more preferably in the range from 2.0 to 20.0 g/10 min.

Preferably, the high density polyethylene (HDPE) according to the present invention is a high density polyethylene known in the art. In particular, it is preferred that the high density polyethylene (HDPE) is the commercial ethylene homopolymer "HE9621-PH" of Borealis AG.

The Talc

A further essential component of the present invention is the talc (T). It is preferred that the talc (T) has median particle size ($d_{50}$) in the range from 0.3 to 3.0 μm and a top cut particle size ($d_{95}$) in the range from 0.5 to 10.0 μm measured according to ISO 13317-3.

According to one embodiment that the talc (T) has median particle size ($d_{50}$) in the range from 0.5 to 2.5 μm and a top cut particle size ($d_{95}$) in the range from 1.0 to 8.0 μm measured according to ISO 13317-3.

According to the present invention, the talc (T) does not belong to the class of alpha nucleating agents and additives (A).

The talc (T) is state of the art and a commercially available product.

The Additives (A)

The inventive composition may in addition comprise additives (A). Typical additives are acid scavengers, nucleating agents, antioxidants, colorants, light stabilizers, slip agents, anti-scratch agents, dispersing agents, processing aids, lubricants, pigments, carbon black masterbatches, and the like.

Such additives are commercially available and for example described in "Plastic Additives Handbook", 6th edition 2009 of Hans Zweifel (pages 1141 to 1190).

Additives are typically provided in the form of a masterbatch. A masterbatch is a composition in which an additive or an additive mixture in rather high amount is dispersed in a polymer. Accordingly, the term "additive" according to the present invention also includes carrier materials, in particular polymeric carrier materials, in which the "active additive" or "active additive mixture" is dispersed.

The Automotive Article

The present invention is further directed to an automotive article comprising at least 90 wt.-%, preferably at least 95 wt.-%, of the composition according to the invention. The present invention is especially directed to an automotive interior article comprising at least 90 wt.-%, preferably at least 95 wt.-%, of the composition according to the invention. Yet more preferably, the present invention is directed to an automotive interior article consisting of the composition according to the invention. Examples for such automotive interior articles are dashboards, center consoles, door claddings and pillar trims.

Especially Preferred Embodiments

The invention is especially directed to a composition having a melt flow rate $MFR_2$ (230° C., 2.16 kg), measured according to ISO 1133, in the range from 10.0 to 30.0 g/10 min and consisting of
- (A) 18.0 to 60.0 wt.-%, based on the total composition, of a heterophasic composition (HECO);
- (B) 7.0 to 55.0 wt.-%, based on the total composition, of a polypropylene-polyethylene blend (B);
- (C) 2.0 to 12.0 wt.-%, based on the total composition, of a high density polyethylene (HDPE);
- (D) 2.0 to 12.0 wt.-%, based on the total composition, of plastomer (P);
- (E) 7.0 to 25.0 wt.-%, based on the total composition, of talc (T); and
- (F) 1.0 to 5.0 wt.-%, based on the total composition, of additives (A);

wherein the weight ratio between the heterophasic composition (HECO) and the polypropylene-polyethylene blend (B) [(HECO)/(B)] is in the range from 0.2 to 8.0, preferably from 0.3 to 6.0;

wherein further
the heterophasic composition (HECO) comprises
- (a) a propylene homopolymer as the matrix, and
- (b) an ethylene-propylene rubber being dispersed in said matrix, wherein the heterophasic propylene copolymer (HECO) has
- (i) a melting temperature Tm, measured by DSC according to ISO 11357-3 (heating and cooling rate 10° C./min), in the range from 153 to 158° C.;
- (ii) a melt flow rate $MFR_2$ (230° C., 2.16 kg), measured according to ISO 1133, in the range from 20.0 to 120 g/10 min;
- (iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);
- (iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and
- (v) a total ethylene content, measured by Fourier Transform Infrared Spectroscopy (FTIR) during CRYSTEX analysis, in the range from 1.5 to 6.5 mol.-%, wherein ethylene is the sole comonomer in the heterophasic composition (HECO);

the polypropylene-polyethylene blend (B) comprises:
- B-1) at least 85.0 wt.-%, relative to the total weight of the polypropylene-polyethylene blend (B), of polypropylene,
- B-2) at most 15.0 wt.-%, relative to the total weight of the polypropylene-polyethylene blend (B), of polyethylene, wherein, the polypropylene-polyethylene blend (B) has:
- i) a melt flow rate $MFR_2$ (230° C., 2.16 kg), measured according to ISO 1133, in the range from 5.0 to 75 g/10 min; and
- ii) a residual ash content, measured by thermogravimetric analysis in the range from 0.1 to 3.0 wt.-% the plastomer being an ethylene 1-octene copolymer or an ethylene 1-butene copolymer having a density measured according to ISO 1183-1 in the range from 850 to 900 kg/m$^3$.

The invention is in particular directed to a composition having a melt flow rate $MFR_2$ (230° C., 2.16 kg), measured according to ISO 1133, in the range from 10.0 to 30.0 g/10 min and consisting of
- (A) 18.0 to 60.0 wt.-%, based on the total composition, of a heterophasic composition (HECO);
- (B) 7.0 to 55.0 wt.-%, based on the total composition, of a polypropylene-polyethylene blend (B);
- (C) 2.0 to 12.0 wt.-%, based on the total composition, of a high density polyethylene (HDPE);
- (D) 5.0 to 15.0 wt.-%, based on the total composition of polyethylene being the sum of said high density polyethylene (HDPE) and polyethylene contained in said polypropylene-polyethylene blend (B);
- (E) 2.0 to 12.0 wt.-%, based on the total composition, of plastomer (P);
- (F) 7.0 to 25.0 wt.-%, based on the total composition, of talc (T); and
- (G) 1.0 to 5.0 wt.-%, based on the total composition, of additives (A);

wherein the weight ratio between the heterophasic composition (HECO) and the polypropylene-polyethylene blend (B) [(HECO)/(B)] is in the range from 0.2 to 8.0, preferably from 0.3 to 6.0;

wherein further
the heterophasic composition (HECO) comprises
- (a) a propylene homopolymer as the matrix, wherein the propylene homopolymer has 2,1 regiodefects, determined by $^{13}$C-NMR, in the range from 0.05 to 0.90%, and
- (b) an ethylene-propylene rubber being dispersed in said matrix, wherein the heterophasic propylene copolymer (HECO) has
- (i) a melting temperature Tm, measured by DSC according to ISO 11357-3 (heating and cooling rate 10° C./min), in the range from 153 to 158° C.;
- (ii) a melt flow rate $MFR_2$ (230° C., 2.16 kg), measured according to ISO 1133, in the range from 20.0 to 120 g/10 min;
- (iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);
- (iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO);
- (v) an intrinsic viscosity of the soluble fraction (IV (SF)) of the heterophasic composition (HECO), measured according to ISO 1628-1 (at 135° C. in decalin), in the range from 2.00 to 3.00 dl/g;
- (vi) an intrinsic viscosity of the crystalline fraction (IV(CF)) of the heterophasic composition (HECO), measured according to ISO 1628-1 (at 135° C. in decalin), in the range from 1.00 to 1.50 dl/g;
- (vii) a ratio between the intrinsic viscosity of the soluble fraction (SF) and the intrinsic viscosity of the crystalline fraction (CF) [IV(SF)/IV(CF)] of the heterophasic composition (HECO) is in the range from 1.50 to 2.80;
(viii) an ethylene content of the soluble fraction (C2 (SF)), measured by Fourier Transform Infrared Spectroscopy (FTIR) during CRYSTEX analysis, in the range from 22.0 to 39.0 mol-%;
(ix) an ethylene content of the crystalline fraction (C2(CF)), measured by Fourier Transform Infrared Spectroscopy (FTIR) during CRYSTEX analysis, in the range from 0.0 to 0.7 mol-%; and
(x) a total ethylene content, measured by Fourier Transform Infrared Spectroscopy (FTIR) during CRYSTEX analysis, in the range from 1.5 to 6.5 mol.-%, wherein ethylene is the sole comonomer in the heterophasic composition (HECO);

the polypropylene-polyethylene blend (B) comprises:
B-1) at least 85.0 wt.-%, relative to the total weight of the polypropylene-polyethylene blend (B), of polypropylene,
B-2) at most 15.0 wt.-%, relative to the total weight of the polypropylene-polyethylene blend (B), of polyethylene,
wherein the polypropylene-polyethylene blend (B) has:
i) a melt flow rate $MFR_2$ (230° C., 2.16 kg), measured according to ISO 1133, in the range from 5.0 to 75 g/10 min; and
ii) a residual ash content, measured by thermogravimetric analysis in the range from 0.1 to 3.0 wt.-%; and one or more of the following:
iii) a content of limonene as determined by using solid phase microextration (HS-SPME-GC-MS) of from 0.1 ppm to 100 ppm;
iv) a content of fatty acid(s) as determined by using solid phase microextration (HS-SPME-GC-MS) of 0.1 to 100 ppm;
v) a content of polyamide(s) as determined by NMR of 0 to 1.5 wt.-%;
vi) a content of polystyrene(s) as determined by NMR of 0.05 to 3.0 wt.-%;

the plastomer being an ethylene 1-octene copolymer or an ethylene 1-butene copolymer having a density measured according to ISO 1183-1 in the range from 850 to 900 kg/m$^3$ and a melt flow rate $MFR_2$ (190° C., 2.16 kg), measured according to ISO 1133, in the range from 1.5 to 15.0 g/10 min;
the polyethylene (HDPE) having a density, measured according to ISO 1183-1, in the range from 940 to 970 kg/m$^3$ and a melt flow rate $MFR_2$ (190° C., 2.16 kg), measured according to ISO 1133, in the range from 1.0 to 30.0 g/10 min;
the talc (T) having a median particle size $d_{50}$ measured according to ISO 13317-3 in the range from 0.3 to 3.0 μm and a top cut particle size $d_{95}$ measured according to ISO 13317-3 in the range 0.5 to 10.0 μm;

In the following the invention will be described by way of examples.

EXAMPLES

Melt Flow Rate

The melt flow rate ($MFR_2$) is determined according to ISO 1133 and is indicated in g/10 min. The $MFR_2$ of heterophasic propylene copolymer is determined at a temperature of 230° C. and under a load of 2.16 kg, whereas the $MFR_2$ of the plastomer and of the HDPE is determined at a temperature of 190° C. and under a load of 2.16 kg.

Melting Temperature $T_m$ and Crystallization Temperature $T_c$

The melting temperature $T_m$ is determined by differential scanning calorimetry (DSC) according to ISO 11357-3 with a TA-Instruments 2920 Dual-Cell with RSC refrigeration apparatus and data station. A heating and cooling rate of 10° C./min is applied in a heat/cool/heat cycle between +23 and +210° C. The crystallization temperature ($T_c$) is determined from the cooling step while melting temperature ($T_m$) and melting enthalpy ($H_m$) are being determined in the second heating step.

Crystex Analysis

Crystalline and Soluble Fractions Method

Figure 1B:
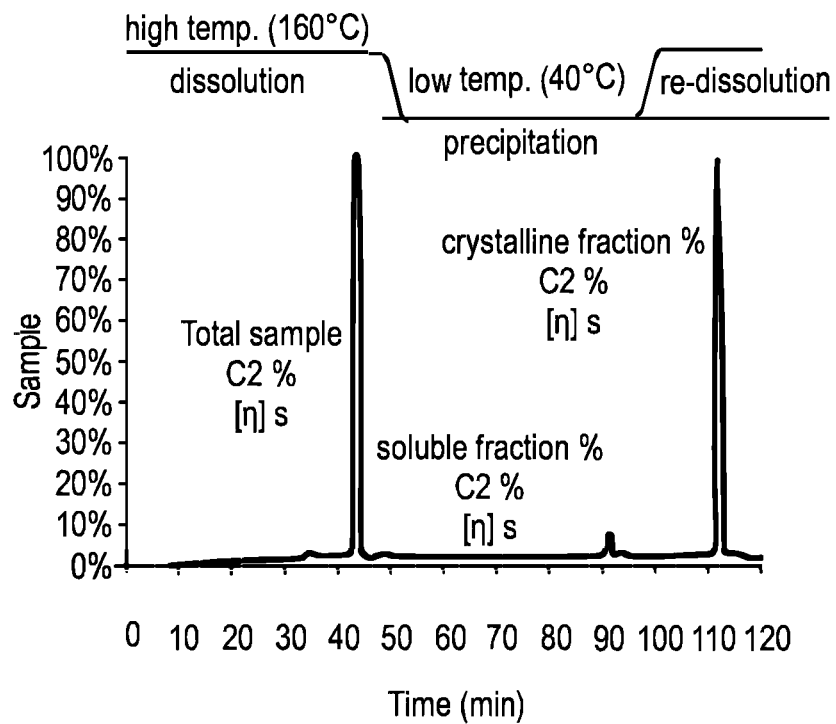
FIG. 1(b) is the Elution of the EP copolymer sample and obtained soluble and crystalline fractions in the TREF column.

The crystalline fraction (CF) and soluble fraction (SF) of the heterophasic propylene copolymers, the final comonomer content of the heterophasic propylene copolymers, the comonomer content of the respective fractions as well as the intrinsic viscosities of the respective fractions were analyzed by the CRYSTEX QC, Polymer Char (Valencia, Spain) on basis ISO 6427 Annex B: 1992 (E). A schematic representation of the CRYSTEX QC instrument is shown in FIG. 1a. The crystalline and amorphous fractions are separated through temperature cycles of dissolution in 1,2,4-trichlorobenzene (1,2,4-TCB) at 160° C., crystallization at 40° C. and re-dissolution in 1,2,4-TCB at 160° C. as shown in FIG. 1b. Quantification of SF and CF and determination of ethylene content (C2) are achieved by means of an infrared detector (IR4) and an online 2-capillary viscometer is used for the determination of the intrinsic viscosity (iV). IR4 detector is a multiple wavelength detector measuring IR absorbance at two different bands (CH$_3$ stretching vibration (centred at approx. 2960 cm$^{-1}$) and CH$_x$ stretching vibration (2700-3000 cm$^{-1}$) which can be used to determine of the concentration and the ethylene content in ethylene-propylene copolymers (EP Copolymers). The IR4 detector is calibrated with series of 8 ethylene-propylene copolymers with known ethylene content in the range from 2 wt.-% to 69 wt.-% (determined by $^{13}$C-NMR) and each at various concentrations, in the range from 2 and 13 mg/ml. To account for both features, concentration and ethylene content at the same time for various polymer concentration expected during Crystex analyses the following calibration equations were applied:

$$\text{Conc} = a + b^*\text{Abs}(CH_x) + c^*(\text{Abs}(CH_x))^2 + d^*\text{Abs}(CH_3) + e^*(\text{Abs}(CH_3))^2 + f^*\text{Abs}(CH_x)^*\text{Abs}(CH_3) \quad \text{Equation 1}$$

$$CH_3/1000C = a + b^*\text{Abs}(CH_x) + c^*\text{Abs}(CH_3) + d^*(\text{Abs}(CH_3)/\text{Abs}(CH_x)) + e^*(\text{Abs}(CH_3)/\text{Abs}(CH_x))^2 \quad \text{Equation 2}$$

The constants a to e for equation 1 and a to f for equation 2 were determined by using least square regression analysis.

The CH3/1000C is converted to the ethylene content in wt.-% using following relationship:

$$\text{wt.-\% (Ethylene in EP Copolymers)} = 100 - CH_3/1000TC^*0.3 \quad \text{Equation 3}$$

Amount of soluble fraction (SF) and crystalline fraction (CF) are correlated through the XS calibration to the "Xylene Cold Soluble" (XCS) fraction and "Xylene Cold Insoluble" (XCI) fraction, respectively, determined according to standard gravimetric method as per ISO16152. XS calibration is achieved by testing various EP copolymers with xylene cold soluble (XCS) content in the range 2 to 31 wt.-%. The determined XS calibration is linear:

wt.-% XCS=1.01*wt.-% SF     Equation 4

Intrinsic viscosity (IV) of the parent heterophasic propylene copolymer and its soluble fraction (SF) and crystalline fraction (CF) are determined with a use of an online 2-capillary viscometer and are correlated to corresponding IV's determined by standard method in decalin according to ISO 1628-3. Calibration is achieved with various EP copolymers with IV=2 to 4 dl/g. The determined calibration curve between the Vsp, measured in CRYSTEX QC and normalized by the concentration (c), and the IV is linear:

IV (dl/g)=$a*Vsp/c$     Equation 5 with a slope of a=16.2. A sample of the heterophasic propylene copolymer to be analyzed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 400 rpm. To avoid sample degradation, polymer solution is blanketed with the $N_2$ atmosphere during dissolution.

As shown in a FIGS. 1a and b, a defined volume of the sample solution is injected into the column filled with inert support where the crystallization of the sample and separation of the soluble fraction from the crystalline part is taking place. This process is repeated two times.

During the first injection the whole sample is measured at high temperature, determining the IV[dl/g] and the C2[wt.-%] of the heterophasic propylene copolymer. During the second injection the soluble fraction (SF) (at low temperature, 40° C.) and the crystalline fraction (CF) (at high temperature, 160° C.) with the crystallization cycle are measured (wt.-% SF, wt.-% C2 of SF, IV of SF).

$^{13}$C NMR Spectroscopy-based Determination of C2 Content for the Calibration Standards Quantitative $^{13}C\{^1H\}$ NMR spectra were recorded in the solution-state using a Bruker Avance III 400 NMR spectrometer operating at 400.15 and 100.62 MHz for $^1H$ and $^{13}C$ respectively. All spectra were recorded using a $^{13}C$ optimised 10 mm extended temperature probehead at 125° C. using nitrogen gas for all pneumatics. Approximately 200 mg of material was dissolved in 3 ml of 1,2-tetrachloroethane-$d_2$ (TCE-$d_2$) along with chromium (III) acetylacetonate (Cr(acac)$_3$) resulting in a 65 mM solution of relaxation agent in solvent (Singh, G., Kothari, A., Gupta, V., Polymer Testing 28 5 (2009), 475). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution and quantitatively needed for accurate ethylene content quantification. Standard single-pulse excitation was employed without NOE, using an optimised tip angle, 1 s recycle delay and a bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225, Busico, V., Carbonniere, P., Cipullo, R., Pellecchia, R., Severn, J., Talarico, G., Macromol. Rapid Commun. 2007, 28, 1128). A total of 6144 (6k) transients were acquired per spectra. Quantitative $^{13}C\{^1H\}$ NMR spectra were processed, integrated and relevant quantitative properties determined from the integrals. All chemical shifts were indirectly referenced to the central methylene group of the ethylene block (EEE) at 30.00 ppm using the chemical shift of the solvent. This approach allowed comparable referencing even when this structural unit was not present. Characteristic signals corresponding to the incorporation of ethylene were observed (Cheng, H. N., Macromolecules 17 (1984), 1950) and the comonomer fraction calculated as the fraction of ethylene in the polymer with respect to all monomer in the polymer:

$fE=(E/(P+E))$

The comonomer fraction was quantified using the method of Wang et. al. (Wang, W.-J., Zhu, S., Macromolecules 33 (2000), 1157) through integration of multiple signals across the whole spectral region in the $^{13}C\{^1H\}$ spectra. This method was chosen for its robust nature and ability to account for the presence of regio-defects when needed. Integral regions were slightly adjusted to increase applicability across the whole range from encountered comonomer contents. For systems with very low ethylene content where only isolated ethylene in PPEPP sequences were observed the method of Wang et. al. was modified reducing the influence of integration of sites that are no longer present. This approach reduced the overestimation of ethylene content for such systems and was achieved by reduction of the number of sites used to determine the absolute ethylene content to $E=0.5(S\beta\beta+S\beta\gamma+S\beta\delta+0.5(S\alpha\beta+S\alpha\gamma))$ Through the use of this set of sites the corresponding integral equation becomes $E=0.5(I_H+I_G+0.5(I_C+I_D))$ using the same notation used in the article of Wang et. al. (Wang, W.-J., Zhu, S., Macromolecules 33 (2000), 1157). Equations used for absolute propylene content were not modified. The mole percent comonomer incorporation was calculated from the mole fraction:

$E[mol \%]=100*fE.$

The weight percent comonomer incorporation was calculated from the mole fraction:

$E[wt \%]=100*(fE*28.06)/((fE*28.06)+((1-fE)*42.08))$

Quantification of Microstructure by NMR Spectroscopy

Quantitative nuclear-magnetic resonance (NMR) spectroscopy was used to quantify the isotacticity and regio-regularity of the matrix component of the heterophasic copolymer (HECO) on samples taken after the first gas phase reactor (GPR1).

Quantitative $^{13}C\{^1H\}$ NMR spectra were recorded in the solution-state using a Bruker Advance III 400 NMR spectrometer operating at 400.15 and 100.62 MHz for 1H and 13C respectively. All spectra were recorded using a $^{13}C$ optimised 10 mm extended temperature probehead at 125° C. using nitrogen gas for all pneumatics.

For propylene homopolymers approximately 200 mg of material was dissolved in 1,2-tetrachloroethane-d2 (TCE-d2). To ensure a homogenous solution, after initial sample preparation in a heat block, the NMR tube was further heated in a rotatory oven for at least 1 hour. Upon insertion into the magnet the tube was spun at 10 Hz. This setup was chosen primarily for the high resolution needed for tacticity distribution quantification (Busico, V., Cipullo, R., Prog.

Polym. Sci. 26 (2001) 443; Busico, V.; Cipullo, R., Monaco, G., Vacatello, M., Segre, A. L., Macromolecules 30 (1997) 6251). Standard single-pulse excitation was employed utilising the NOE and bi-level WALTZ16 decoupling scheme (Zhou, Z., Kuemmerle, R., Qiu, X., Redwine, D., Cong, R., Taha, A., Baugh, D. Winniford, B., J. Mag. Reson. 187 (2007) 225; Busico, V., Carbonniere, P., Cipullo, R., Pellecchia, R., Severn, J., Talarico, G., Macromol. Rapid Commun. 2007, 28, 11289). A total of 8192 (8k) transients were acquired per spectra.

Quantitative $^{13}C\{^1H\}$ NMR spectra were processed, integrated and relevant quantitative properties determined from the integrals using proprietary computer programs.

For propylene homopolymers all chemical shifts are internally referenced to the methyl isotactic pentad (mmmm) at 21.85 ppm.

Characteristic signals corresponding to regiodefects (Resconi, L., Cavallo, L., Fait, A., Piemontesi, F., Chem. Rev. 2000, 100, 1253; Wang, W-J., Zhu, S., Macromolecules 33 (2000), 1157; Cheng, H. N., Macromolecules 17 (1984), 1950) or comonomer were observed.

The tacticity distribution was quantified through integration of the methyl region between 23.6-19.7 ppm correcting for any sites not related to the stereo sequences of interest (Busico, V., Cipullo, R., Prog. Polym. Sci. 26 (2001) 443; Busico, V., Cipullo, R., Monaco, G., Vacatello, M., Segre, A. L., Macromolecules 30 (1997) 6251).

Specifically, the influence of regio-defects and comonomer on the quantification of the tacticity distribution was corrected for by subtraction of representative regio-defect and comonomer integrals from the specific integral regions of the stereo sequences.

The isotacticity was determined at the pentad level and reported as the percentage of isotactic pentad (mmmm) sequences with respect to all pentad sequences:

[mmmm] %=100*(mmmm/sum of all pentads)

The presence of 2,1 erythro regio-defects was indicated by the presence of the two methyl sites at 17.7 and 17.2 ppm and confirmed by other characteristic sites. Characteristic signals corresponding to other types of regio-defects were not observed (Resconi, L., Cavallo, L., Fait, A., Piemontesi, F., Chem. Rev. 2000, 100, 1253).

The amount of 2,1 erythro regio-defects was quantified using the average integral of the two characteristic methyl sites at 17.7 and 17.2 ppm:

$P_{21e}=(I_{e6}+I_{e8})/2$

The amount of 1,2 primary inserted propene was quantified based on the methyl region with correction undertaken for sites included in this region not related to primary insertion and for primary insertion sites excluded from this region:

$P_{12}=I_{CH3}+P_{21e}$

The total amount of propene was quantified as the sum of primary inserted propene and all other present regio-defects:

$P_{total}=P_{12}+P_{21e}$

The mole percent of 2,1 erythro regio-defects was quantified with respect to all propene:

[21e] mol.-% =100*(P21e/Ptotal)

Intrinsic Viscosity

The intrinsic viscosity (iV) is measured in analogy to DIN ISO 1628/1, October 1999, in Decalin at 135° C.

Density

Density is measured according to ISO 1183-1. Sample preparation is done by compression moulding in accordance with ISO 1872-2: 2007.

Particle Size Distribution

Median particle size $d_{50}$ and top cut particle size $d_{95}$ are measured by gravitational liquid sedimentation according to ISO 13317-3.

Flexural Modulus

The flexural modulus was determined in 3-point-bending at 23° C. according to ISO 178 on 80×10×4 mm$^3$ test bars injection moulded in line with EN ISO 1873-2.

Notched Impact Strength (NIS)

The Charpy notched impact strength (NIS) was measured according to ISO 179 1 eA at −20° C. and +23° C., using injection moulded bar test specimens of 80×10×4 mm$^3$ prepared in accordance with ISO 294-1: 1996.

VOC Values, FOG Values

Sample Preparation

VOC values and FOG values were measured as described below, after sample preparation consisting of injection moulding plaques in the according to EN ISO 19069-2: 2016. These plaques were packed in aluminium-composite foils immediately after production and the foils were sealed.

For the thermodesorption analysis according to VDA 278 (October 2011) the samples were stored uncovered at room temperature (23° C. max.) for 7 days directly before the commencement of the analysis.

The production date of the injection moulded plaques, the time when the sample arrived in the lab as well as the analysis date were recorded.

VOC and FOC according to VDA278

VOC value is determined according to VDA 278 October 2011 from injection moulded plaques. VDA 278 October 2011, Thermal Desorption Analysis of Organic Emissions for the Characterization of Non-Metallic Materials for Automobiles, VDA Verband der Automobilindustrie. According to the VDA 278 October 2011 the VOC value is defined as "the total of the readily volatile to medium volatile substances. It is calculated as toluene equivalent. The method described in this Recommendation allows substances in the boiling/elution range up to n-pentacosane (C25) to be determined and analyzed."

FOG value is determined according to VDA 278 October 2011 from injection moulded plaques. According to the VDA 278 October 2011 the FOG value is defined as "the total of substances with low volatility, which elute from the retention time of n-tetradecane (inclusive)". It is calculated as hexadecane equivalent. Substances in the boiling range from n-alkanes "C14" to "C32" are determined and analysed.

Specific Methods for Recyclates

Amount of iPP, Polystyrene, Polyethylene (and Ethylene Containing Copolymers), Poly(ethylene terephthalate), and Amount of Polyamide-6

To establish different calibration curves different standards, iPP and HDPE and iPP, PS and PA6 were blended. For the quantification of the content of the foreign polymers, IR spectra were recorded in the solid-state using a Bruker Vertex 70 FTIR spectrometer. Films were prepared with a compression-molding device at 190° C. with 4-6 MPa clamping force. The thickness of the films for the calibration standards for iPP and HDPE was 300 μm and for the quantification of the iPP, PS and PA 6 50-100 μm film thickness was used. Standard transmission FTIR spectroscopy is employed using a spectral range of 4000-400 cm-1, an aperture of 6 mm, a spectral resolution of 2 cm-1, 16 background scans, 16 spectrum scans, an interferogram zero filling factor of 32 and Norton Beer strong apodization.

The absorption of the band at 1167 cm-1 in iPP is measured and the iPP content is quantified according to a calibration curve (absorption/thickness in cm versus iPP content in weight %). The absorption of the band at 1601 cm-1 (PS) and 3300 cm-1 (PA6) are measured and the PS and PA6 content quantified according to the calibration curve (absorption/thickness in cm versus PS and PA content in wt.-%). The content of polyethylene and ethylene containing copolymers is obtained by subtracting (iPP+PS+PA6) from 100, taking into account the content of non-polymeric impurities as determined in the methods below. The analysis is performed as a double determination.

Amount of Metals

Determined by x ray fluorescence (XRF)

Amount of Paper, Wood

Paper and wood were determined by conventional laboratory methods including milling, floatation, microscopy and Thermogravimetric Analysis (TGA).

Amount of Talc and Chalk

TGA according to the following procedure:
Thermogravimetric Analysis (TGA) experiments were performed with a Perkin Elmer TGA 8000. Approximately 10-20 mg of material was placed in a platinum pan. The temperature was equilibrated at 50° C. for 10 minutes, and afterwards raised to 950° C. under nitrogen at a heating rate of 20° C./min. The weight loss between ca. 550° C. and 700° C. (WCO$_2$) was assigned to CO$_2$ evolving from CaCO$_3$, and therefore the chalk content was evaluated as:

Chalk content=100/44×WCO2

Afterwards the temperature was lowered to 300° C. at a cooling rate of 20° C./min. Then the gas was switched to oxygen, and the temperature was raised again to 900° C. The weight loss in this step was assigned to carbon black (Wcb). Knowing the content of carbon black and chalk, the ash content excluding chalk and carbon black was calculated as:

Ash content=(Ash residue)−56/44×WCO2−Wcb

Where Ash residue is the weight % measured at 900° C. in the first step conducted under nitrogen. The ash content is estimated to be the same as the talc content for the investigated recyclates.

Ash Content

Ash content is measured via Thermogravimetric Analysis (TGA) according to the ISO 11358-1 (20147) standard.

Limonene Measurement

Limonene quantification was carried out using solid phase micro-extraction (HS-SPME-GC-MS) by standard addition.

50 mg ground samples were weighed into 20 mL headspace vials and after the addition of limonene in different concentrations and a glass-coated magnetic stir bar. The vial was closed with a magnetic cap lined with silicone/PTFE. Micro capillaries (10 pL) were used to add diluted limonene standards of known concentrations to the sample. Addition of 0, 2, 20 and 100 ng equals 0 mg/kg, 0.1 mg/kg, 1 mg/kg and 5 mg/kg limonene, in addition standard amounts of 6.6 mg/kg, 11 mg/kg and 16.5 mg/kg limonene were used in combination with some of the samples tested in this application. For quantification, ion 93 acquired in SIM mode was used. Enrichment of the volatile fraction was carried out by headspace solid phase micro-extraction with a 2 cm stable flex 50/30 pm DVB/Carboxen/PDMS fibre at 60° C. for 20 minutes. Desorption was carried out directly in the heated injection port of a GCMS system at 270° C.

GCMS Parameters:

Column: 30 m HP 5 MS 0.25*0.25

Injector: Splitless with 0.75 mm SPME Liner, 270° C.

Temperature program: −10° C. (1 min)

Carrier gas: Helium 5.0, 31 cm/s linear velocity, constant flow

MS: Single quadrupole, direct interface, 280° C. interface temperature

Acquisition: SIM scan mode

Scan parameter: 20-300 amu

SIM Parameter: m/Z 93, 100 ms dwell time

Total Free Fatty Acid Content

Fatty acid quantification was carried out using headspace solid phase micro-extraction (HS-SPME-GC-MS) by standard addition.

50 mg ground samples were weighed in 20 mL headspace vial and after the addition of limonene in different concentrations and a glass coated magnetic stir bar the vial was closed with a magnetic cap lined with silicone/PTFE. 10 μL Micro-capillaries were used to add diluted free fatty acid mix (acetic acid, propionic acid, butyric acid, pentanoic acid, hexanoic acid and octanoic acid) standards of known concentrations to the sample at three different levels. Addition of 0, 50, 100 and 500 ng equals 0 mg/kg, 1 mg/kg, 2 mg/kg and 10 mg/kg of each individual acid. For quantification ion 60 acquired in SIM mode was used for all acids except propanoic acid, here ion 74 was used.

GCMS Parameter:

Column: 20 m ZB Wax plus 0.25*0.25

Injector: Split 5:1 with glass lined split liner, 250° C.

Temperature program: 40° C. (1 min) @6° C./min to 120° C., @15° C. to 245° C. (5 min)

Carrier: Helium 5.0, 40 cm/s linear velocity, constant flow

MS: Single quadrupole, direct interface, 220° C. inter face temperature

Acquisition: SIM scan mode

Scan parameter: 46-250 amu 6.6 scans/s

SIM Parameter: m/z 60, 74, 6.6 scans/s

1. Preparation of the Heterophasic Propylene Copolymer (HECO)

a) Preparation of the Single Site Catalyst System

Catalyst Complex

The following metallocene complex has been used as described in WO 2019/179959:

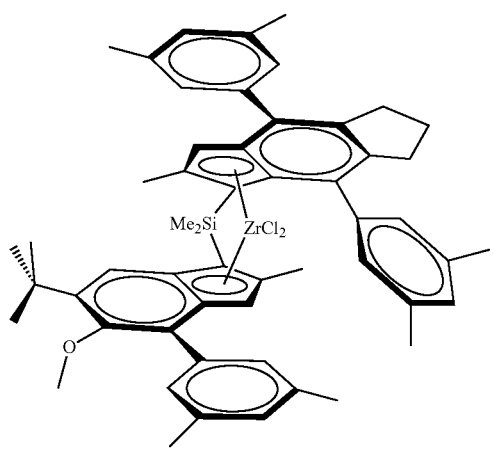

Preparation of MAO-silica Support

A steel reactor equipped with a mechanical stirrer and a filter net was flushed with nitrogen and the reactor temperature was set to 20° C. Next silica grade DM-L-303 from AGC Si-Tech Co, pre-calcined at 600° C. (5.0 kg) was added from a feeding drum followed by careful pressuring and depressurising with nitrogen using manual valves. Then toluene (22 kg) was added. The mixture was stirred for 15 min. Next 30 wt.-% solution of MAO in toluene (9.0 kg) from Lanxess was added via feed line on the top of the reactor within 70 min. The reaction mixture was then heated up to 90° C. and stirred at 90° C. for additional two hours. The slurry was allowed to settle and the mother liquor was filtered off. The catalyst was washed twice with toluene (22 kg) at 90° C., following by settling and filtration. The reactor was cooled off to 60° C. and the solid was washed with heptane (22.2 kg). Finally MAO treated $SiO_2$ was dried at 60° under nitrogen flow for 2 hours and then for 5 hours under vacuum (−0.5 barg) with stirring. MAO treated support was collected as a free-flowing white powder found to contain 12.2% Al by weight.

Single Site Catalyst System Preparation 30 wt.-% MAO in toluene (0.7 kg) was added into a steel nitrogen blanked reactor via a burette at 20° C. Toluene (5.4 kg) was then added under stirring. The metallocene complex as described above under 2a) (93 g) was added from a metal cylinder followed by flushing with 1 kg toluene. The mixture was stirred for 60 minutes at 20° C. Trityl tetrakis(pentafluorophenyl) borate (91 g) was then added from a metal cylinder followed by a flush with 1 kg of toluene. The mixture was stirred for 1 h at room temperature. The resulting silution was added to a stirred cake of MAO-silica support prepared as described above over 1 hour. The cake was allowed to stay for 12 hours, foiled by drying under $N_2$ flow at 60° C. for 2 h and additionaly for 5 h under vacuum (−0.5 barg) under stirring stirring.

Dried catalyst was sampled in the form of pink free flowing powder containing 13.9% Al and 0.11% Zr.

TABLE 1

Polymerization conditions of HECO1

| | | HECO1 |
|---|---|---|
| Prepolymerization | | |
| Temperature | [° C.] | 18 |
| Pressure | [kPa] | 4867 |
| Catalyst feed | [g/h] | 2.4 |
| C3 feed | [kg/h] | 72 |
| H2 feed | [g/h] | 0.2 |
| Residence time | [h] | 0.36 |
| Loop (Reactor 1) | | |
| Temperature | [° C.] | 70 |
| Pressure | [kPa] | 4867 |
| H2/C3 ratio | [mol/kmol] | 0.35 |
| Residence time | [h] | 0.29 |
| Loop reactor split | [wt.-%] | 56.6 |
| $MFR_2$ | [g/10 min] | 101 |
| GPR1 (Reactor 2) | | |
| Temperature | [° C.] | 80 |
| Pressure | [kPa] | 2500 |
| H2/C3 ratio | [mol/kmol] | 1.7 |
| Polymer residence time | [h] | 1.20 |
| GPR reactor split | [wt.-%] | 31.9 |
| $MFR_2$ | [g/10 min] | 101 |
| GPR2 (Reactor 3) | | |
| Temperature | [° C.] | 70 |
| Pressure | [kPa] | 2500 |
| H2/C2 ratio | [mol/kmol] | 1.7 |
| C2/C3 ratio | [mol/kmol] | 821.7 |
| Polymer residence time | [h] | 1.40 |
| GPR reactor split | [wt.-%] | 11.5 |
| $MFR_2$ | [g/10 min] | 76 |

TABLE 2

Properties of HECO, HECO2 and HECO3

| | | HECO1 | HECO2 | HECO3 |
|---|---|---|---|---|
| $MFR_2$ | [g/10 min] | 76 | 100 | 13 |
| <2.1> defects (matrix) | [%] | 0.60 | 0 | 0 |
| crystalline fraction (CF) | [wt.-%] | 89.3 | 85.3 | 83.7 |
| soluble fraction (SF) | [wt.-%] | 10.6 | 14.7 | 16.3 |
| ethylene content | [wt.-%] | 2.2 | 8.0 | 7.5 |
| ethylene content | [mol-%] | 3.3 | 11.5 | 10.8 |
| ethylene of CF (C2(CF)) | [wt.-%] | 0 | 2.4 | 1.5 |
| ethylene of CF (C2(CF)) | [mol-%] | 0 | 3.6 | 2.2 |
| ethylene of SF (C2(SF)) | [wt.-%] | 23.3 | 39.5 | 39.1 |
| ethylene of SF (C2(SF)) | [mol-%] | 31.3 | 49.7 | 49.1 |
| melting temperature Tm | [° C.] | 157 | 165 | 165 |
| crystallization temperature Tc | [° C.] | 121 | 121 | 120 |
| intrinsic viscosity of CF (IV(CF)) | [dl/g] | 1.1 | 1.2 | 1.9 |
| intrinsic viscosity of SF (IV(SF)) | [dl/g] | 2.5 | 3.1 | 2.5 |
| IV(SF)/IV(CF) | [—] | 2.3 | 2.6 | 1.3 |
| Flexural modulus | [MPa] | 1257 | 1500 | 1220 |
| Notched impact strength (23° C.) | [$KJ/m^2$] | 3.9 | 4.0 | 6.3 |
| Notched impact strength (−20° C.) | [$KJ/m^2$] | 2.0 | 2.0 | 3.8 |

TABLE 3

Formulations and properties of the comparative and inventive compositions

| | | CE1 | CE2 | CE3 | IE1 | IE2 | IE3 |
|---|---|---|---|---|---|---|---|
| HECO1 | [wt.-%] | 66.42 | — | — | 56.42 | 36.42 | 21.42 |
| HECO2 | [wt.-%] | — | 32.5 | — | — | — | — |
| HECO3 | [wt.-%] | — | 33.92 | — | — | — | — |
| Blend (B) | [wt.-%] | — | — | 100 | 10 | 30 | 45 |
| Plastomer | [wt.-%] | 6 | 6 | — | 6 | 6 | 6 |
| HDPE | [wt.-%] | 8 | 8 | — | 8 | 8 | 8 |
| total polyethylene (HDPE + PE from blend (B)) | [wt.-%] | — | — | — | 8.7 | 10.1 | 11.2 |
| ash content | [wt.-%] | — | — | 1.7 | nd | nd | nd |
| limonene | [ppm] | — | — | >0.1 | nd | nd | nd |
| Talc | [wt.-%] | 17 | 17 | — | 17 | 17 | 17 |
| Additives | [wt.-%] | 2.58 | 2.58 | — | 2.58 | 2.58 | 2.58 |
| MFR$_2$ | [g/10 min] | 24 | 24 | 23 | 22 | 19 | 18 |
| Flexural modulus | [MPa] | 2050 | 2164 | 1470 | 2089 | 2015 | 2030 |
| Notched impact strength (23° C.) | [KJ/m$^2$] | 6.46 | 5.6 | 5.3 | 6.24 | 6.21 | 6.19 |
| Notched impact strength (−20° C.) | [KJ/m$^2$] | 2.3 | 2.6 | 3.5 | 2.3 | 2.28 | 2.57 |
| VOC | [μg/g] | 23 | 112 | 150 | 21 | 31 | 38 |
| FOG | [μg/g] | 138 | 362 | 640 | 127 | 191 | 265 |

"HECO2" is the commercial heterophasic propylene copolymer "BJ400HP" of Borealis AG, Austria (see table 2 for properties);

"HECO3" is the commercial heterophasic propylene copolymer "BE170CF" of Borealis AG, Austria (see table 2 for properties);

"Blend (B)" is an experimental recycled polypropylene-polyethylene blend from a sequence of sorting, washing and compounding steps, based on separately collected post-consumer plastic waste. It has a PP content of 91.2 wt %, a total ethylene content as determined by FTIR of 7.0 wt %, an ash content of 1.7 wt % and a limonene content of more than 0.1 ppm (see table 3 for further properties).

"Plastomer" is the commercial ethylene 1-octene copolymer "Engage 8200" of Dow Chemical Company, USA, having a density of 870 kg/m$^3$ and melt flow rate MFR$_2$ (190° C., 2.16 kg) of 5.0 g/10 min;

"HDPE" is the commercial high density polyethylene "HE9621-PH" of Borealis AG, Austria, having a density of 964 kg/m$^3$ and melt flow rate MFR$_2$ (190° C., 2.16 kg) of 12.0 g/10 min;

Talc is the commercial talc "Jetfine 3 CA" of Imerys, United Kingdom, having a median particle size d$_{50}$ of 1.2 μm and a top cut particle size d$_{95}$ of 3.3 μm;

"Additives" is a mixture of the following components:
15.5 wt.-%, based on the total weight of the "Additives", of the commercial medium molecular weight solid epoxy resin "NPES 902" of Nan Ya Plastics Corp. (Republic of China), 8.9 wt.-%, based on the total weight of the "Additives", of the commercial erucamide "Finawax-E" of Fine Organics (United Kingdom);

7.8 wt.-%, based on the total weight of the "Additives", of the commercial nucleating agent "NA-21" of Adeka (France), a mixture of aluminiumhydroxy-bis[2,2'-methylene-bis(4,6-di-t-butylphenyl)phosphate] and lithium myristate, 7.8 wt.-%, based on the total weight of the "Additives", of the light stabilizer Cyasorb UV-3808PP5 of Solvay, a masterbatch of 25 wt.-% of n-Hexadecyl-3,5-di-t-butyl-4-hydroxybenzoate and 25 wt.-% of esters of 2,2,6,6-tetramethyl-4-piperidinol and higher fatty acids (mainly stearic acid), the latter being commercially available as Cyasorb UV-3853 of Solvay, in PP homopolymer, 5.8 wt.-%, based on the total weight of the "Additives", the commercial stericallly hindered phenol octadecyl-3-(3,5-di-tert-butyl-4-hydroxyphenyl)propionate "Songnox 1076" of Songwon (Republic of Korea), 3.9 wt.-%, based on the total weight of the "Additives", the commercial phosphorous based antioxidant tris (2,4-di-t-butylphenyl) phosphite "Irgafos 168" of BASF SE (Germany), 50.3 wt.-%, based on the total weight of the "Additives", of a carbon black master batch Plasblak 10 PPP6331 of Cabot Corporation (Germany).

As can be seen from the data in Table 3, the HECO of the present invention can be replaced in varying amounts with a recycled polypropylene-polyethylene blend, without markedly impairing the mechanical and odor properties of the final compositions (compare IE1 to IE3 with CE1). The stiffness remains almost constant, despite the addition of a lower stiffness component (see stiffness of CE3 for recycled material stiffness), whilst the Impact properties and odor properties are significantly better than would be expected by simple estimates based on the properties of the recycled material. This enables the repurposing of recycled materials to replace potentially costly virgin HECO in automotive applications, whilst also contributing to the minimisation of plastic waste through recycling.

The invention claimed is:
1. A composition obtainable by blending
(A) 18.0 to 60.0 wt.-%, based on the total composition, of a heterophasic composition (HECO);
(B) 7.0 to 55.0 wt.-%, based on the total composition, of a recycled polypropylene-polyethylene blend (B);
(C) 0.0 to 12.0 wt.-%, based on the total composition, of a high density polyethylene (HDPE);
(D) 5.0 to 15.0 wt.-%, based on the total composition of polyethylene being the sum of said high density polyethylene (HDPE) and polyethylene contained in said recycled polypropylene-polyethylene blend (B);
(E) 2.0 to 12.0 wt.-%, based on the total composition, of plastomer (P); and

(F) 7.0 to 25.0 wt.-%, based on the total composition, of talc (T);
wherein the heterophasic composition (HECO), the polypropylene-polyethylene blend (B), the high density polyethylene (HDPE), the plastomer (P) and the talc (T) make up together at least 90 wt.-% of the total composition;
wherein further
the heterophasic composition (HECO) comprises
(a) a propylene homopolymer as the matrix, and
(b) an ethylene-propylene rubber being dispersed in said matrix,
wherein the heterophasic propylene copolymer (HECO) has
(i) a melting temperature Tm, measured by DSC according to ISO 11357-3 (heating and cooling rate 10° C./min), in the range from 150 to 159° C.;
(ii) a melt flow rate $MFR_2$ (230° C., 2.16 kg), measured according to ISO 1133, in the range from 20.0 to 120 g/10 min;
(iii) a crystalline fraction (CF), determined according to CRYSTEX QC method ISO 6427 Annex B, present in an amount in the range from 79.0 to 91.0 wt.-%, relative to the total weight of the heterophasic propylene copolymer (HECO);
(iv) a soluble fraction (SF), determined according to CRYSTEX QC method ISO 6427 Annex B, present in an amount in the range from 9.0 to 21.0 wt.-%, relative to the total weight of the heterophasic propylene copolymer (HECO); and
(v) a total ethylene content, measured by Fourier Transform Infrared Spectroscopy (FITR) during CRYSTEX analysis, in the range from 1.5 to 6.5 mol.-%, wherein ethylene is the sole comonomer in the heterophasic composition (HECO);
the recycled polypropylene-polyethylene blend (B) comprises:
B-1) at least 85.0 wt.-%, relative to the total weight of the recycled polypropylene-polyethylene blend (B), of polypropylene,
B-2) at most 15.0 wt.-%, relative to the total weight of the recycled polypropylene-polyethylene blend (B), of polyethylene,
wherein the recycled polypropylene-polyethylene blend (B) has:
i) a melt flow rate $MFR_2$ (230° C., 2.16 kg), measured according to ISO 1133, in the range from 5.0 to 75 g/10 min; and
ii) a residual ash content, measured by thermogravimetric analysis according to ISO 11358-1 in the range from 0.1 to 3.0 wt.-%; and one or more of the following:
iii) a content of limonene as determined by using solid phase microextraction (HS-SPME-GC-MS) of from 0.1 ppm to 100 ppm;
iv) a content of fatty acid(s) as determined by using solid phase microextraction (HS-SPME-GC-MS) of 0.1 to 100 ppm;
v) a content of polyamide(s) as determined by NMR of up to 1.5 wt.-% and above the detection limit;
vi) a content of polystyrene(s) as determined by NMR of 0.05 to 3.0 wt.-%;
the plastomer being an ethylene 1-octene copolymer or an ethylene 1-butene copolymer having a density measured according to ISO 1183-1 in the range from 850 to 900 kg/m³.

2. The composition according to claim 1, wherein the heterophasic propylene copolymer (HECO) has 2,1 regio-defects, determined by $^{13}C$-NMR, in the range from 0.05 to 0.90%, and/or a melting temperature Tm, measured by DSC according to ISO 11357-3 (heating and cooling rate 10° C./min), in the range from 153 to 158° C.

3. The composition according to claim 1, wherein the ethylene content of the soluble fraction (C2(SF)) of the heterophasic composition (HECO), measured by Infrared Spectroscopy during CRYSTEX analysis, is in the range from 22.0 to 39.0 mol-%.

4. The composition according to claim 1, wherein the ethylene content of the crystalline fraction (C2(CF)) of the heterophasic composition (HECO), measured by Infrared Spectroscopy during CRYSTEX analysis, is in the range from 0.0 to 0.7 mol-%.

5. The composition according to claim 1, wherein the heterophasic composition (HECO) has
(i) an intrinsic viscosity of the soluble fraction (IV(SF)) in the range from 1.80 to 3.20 dl/g as obtained by CRYSTEX analysis and correlated to intrinsic viscosities measured in decalin according to ISO1628-3 at 135° C.;
(ii) an intrinsic viscosity of the crystalline fraction (IV (CF)) in the range from 0.80 to 1.80 dl/g as obtained by CRYSTEX analysis and correlated to intrinsic viscosities measured in decalin according to ISO1628-3 at 135° C.; and
(iii) a ratio between the intrinsic viscosity of the soluble fraction (SF) and the intrinsic viscosity of the crystalline fraction (CF) [IV(SF)/IV(CF)] both as obtained by CRYSTEX analysis and correlated to intrinsic viscosities measured in decalin according to ISO1628-3 at 135° C. in the range from 1.50 to 2.80.

6. The composition according to claim 1, wherein the recycled polypropylene-polyethylene blend (B) originates in an amount of at least 90 wt.-% from post-consumer waste.

7. The composition according to claim 1, wherein the weight ratio between the heterophasic composition (HECO) and the recycled polypropylene-polyethylene blend (B) [(HECO)/(B)] is in the range from 0.2 to 8.0, preferably from 0.3 to 6.0.

8. The composition according to claim 1, wherein the plastomer is an ethylene 1-octene copolymer having a melt flow rate $MFR_2$ (190° C., 2.16 kg), measured according to ISO 1133, in the range from 2.0 to 10.0 g/10 min and has a density, measured according to ISO 1183-1, in the range from 860 to 890 kg/m².

9. The composition according to claim 1, wherein the high density polyethylene (HDPE) has a density measured according to ISO 1183-1 in the range from 940 to 970 kg/m³ and melt flow rate $MFR_2$ (190° C., 2.16 kg), measured according to ISO 1133, in the range from 2.0 to 20.0 g/10 min.

10. The composition according to claim 1, wherein the composition comprises 2 to 12 wt.-%, based on the total composition, of the high density polyethylene (HDPE).

11. The composition according to claim 1 consisting of
(A) 18.0 to 60.0 wt.-%, based on the total composition, of the heterophasic composition (HECO);
(B) 7.0 to 55.0 wt.-%, based on the total composition, of the recycled polypropylene-polyethylene blend (B);
(C) 2.0 to 12.0 wt.-%, based on the total composition, of the high density polyethylene (HDPE);
(D) 2.0 to 12.0 wt.-%, based on the total composition, of the plastomer (P);
(E) 7.0 to 25.0 wt.-%, based on the total composition, of the talc (T); and (F) 1.0 to 10.0 wt.-%, based on the total composition, of additives (A).

12. The composition according to claim 1, wherein the talc (T) has a median particle size $d_{50}$ measured according to ISO 13317-3 in the range from 0.5 to 2.0 μm and a top cut particle size $d_{95}$ measured according to ISO 13317-3 in the range 1.0 to 8.0 μm.

13. The composition according to claim 1 having a melt flow rate $MFR_2$ (230° C., 2.16 kg), measured according to ISO 1133, in the range from 10.0 to 30.0 g/10 min.

14. The composition according to claim 1, having a VOC as measured on the material as obtained directly from the extrusion following the procedure as described in VDA278 of less than 100 μg per gram of composition.

15. An automotive article comprising at least 95 wt.-% of the composition according to claim 1.

* * * * *